(12) United States Patent
Shen et al.

(10) Patent No.: US 10,540,538 B2
(45) Date of Patent: Jan. 21, 2020

(54) BODY INFORMATION ANALYSIS APPARATUS AND BLUSH ANALYSIS METHOD THEREOF

(71) Applicant: CAL-COMP BIG DATA, INC., New Taipei (TW)

(72) Inventors: Shyh-Yong Shen, New Taipei (TW); Min-Chang Chi, New Taipei (TW); Eric Budiman Gosno, Id (ID)

(73) Assignee: CAL-COMP BIG DATA, INC., New Taipei (TW)

(*) Notice: Subject to any disclaimer, the term of this patent is extended or adjusted under 35 U.S.C. 154(b) by 160 days.

(21) Appl. No.: 15/870,992

(22) Filed: Jan. 14, 2018

(65) Prior Publication Data

US 2019/0087641 A1 Mar. 21, 2019

(30) Foreign Application Priority Data

Sep. 15, 2017 (CN) .......................... 2017 1 0833322

(51) Int. Cl.
*G06K 9/00* (2006.01)
*G06T 7/90* (2017.01)
(Continued)

(52) U.S. Cl.
CPC ......... *G06K 9/00234* (2013.01); *A45D 42/00* (2013.01); *A47G 1/02* (2013.01);
(Continued)

(58) Field of Classification Search
CPC ........... G06K 9/00234; G06K 9/00281; G06K 9/4652; G06K 9/3233; G06K 9/00248;
(Continued)

(56) References Cited

U.S. PATENT DOCUMENTS 9,750,420 B1* 9/2017 Agrawal ............ A61B 5/02427
2006/0045382 A1* 3/2006 Adachi .............. G06K 9/00248
382/291
(Continued)

FOREIGN PATENT DOCUMENTS

JP 2007175384 A 7/2007
JP 2008257381 A 10/2008
(Continued)

OTHER PUBLICATIONS

Alice Towler et al; "Evaluating Training Methods for Facial Image Comparison: The Face Shape Strategy does not work", Perception, vol. 43, No. 2-3, Jan. 1, 2014, pp. 214-218, XP055510070, GB ISSN: 0301-0066, DOI: 10.1068/p7676, abstract, pp. 214, para. 1; Fig. 1a.
(Continued)

*Primary Examiner* — Jerome Grant, II
(74) *Attorney, Agent, or Firm* — Chun-Ming Shih; HDLS IPR Services

(57) ABSTRACT

A blush analysis method adopted by a body information analysis apparatus (1) includes following steps: determining a face type of a face after the face is recognized by an image recognition module (12) of the apparatus (1); searching blush positions upon the face through a positioning process that corresponds to the determined face type; analyzing average color values of a right-side blush and a left-side blush; comparing the average color value of the right-side blush with the average color value of the left-side blush, or comparing the two average color values with a default color value; displaying a comparison result at a display module (111) of the apparatus (1); and re-executing above steps before an auxiliary function is terminated.

20 Claims, 18 Drawing Sheets

(51) Int. Cl.
  *G09B 5/02* (2006.01)
  *A47G 1/02* (2006.01)
  *A45D 42/00* (2006.01)
  *G09B 19/00* (2006.01)
  *A45D 44/00* (2006.01)

(52) U.S. Cl.
  CPC ..... *G06K 9/00248* (2013.01); *G06K 9/00268* (2013.01); *G06K 9/00281* (2013.01); *G06T 7/90* (2017.01); *G09B 5/02* (2013.01); *G09B 19/0023* (2013.01); *A45D 2044/007* (2013.01); *G06T 2207/10024* (2013.01); *G06T 2207/30201* (2013.01)

(58) Field of Classification Search
  CPC .. G06K 9/00268; G09B 19/0023; G09B 5/02; A45D 42/00; A45D 2044/007; A47G 1/02; G06T 7/90; G06T 2207/30201; G06T 2207/10024
  USPC ........................................................ 382/182
  See application file for complete search history.

(56) References Cited

U.S. PATENT DOCUMENTS

| | | | | |
|---|---|---|---|---|
| 2011/0115786 | A1* | 5/2011 | Mochizuki | G06T 11/001 345/419 |
| 2012/0044335 | A1 | 2/2012 | Goto | |
| 2013/0169827 | A1* | 7/2013 | Santos | H04N 5/23229 348/207.1 |
| 2015/0145882 | A1* | 5/2015 | Nguyen | H04N 1/622 345/589 |
| 2015/0157243 | A1* | 6/2015 | Do | A61B 5/1032 600/408 |

FOREIGN PATENT DOCUMENTS

| | | |
|---|---|---|
| JP | 2009213751 A | 9/2009 |
| JP | 2012095730 A | 5/2012 |
| JP | 201414969 A | 8/2014 |
| JP | 5656603 B2 | 1/2015 |
| JP | 2015072697 A | 4/2015 |

OTHER PUBLICATIONS

Farhad Naini: "Facial Aesthetics" In: "Facial Aesthetics", Jan. 1, 2011, Wiley, XP055510124, pp. 130, table 8.2.

Harmer K. et al: "Automatic blush detection in "concealed information" test using visual stimuli", 2010 International Conference of Soft Computing and Pattern Recognition (SOCPAR), IEEE, Piscatway, NJ, USA, Dec. 7, 2010, pp. 259-264, XP031848000, ISBN: 978-1-4244-7897-2, abstract, pp. 261, left-hand column, para. 3; Fig. 1; pp. 261, right-hand column, para. 1—pp. 262, right-hand column, para. 2.

Lingyun Wen: "Facial Image Analysis for Body Mass Index, Makeup and Identity" In: "Facial Image Analysis for Body Mass Index, Makeup and Identity", Jan. 1, 2014, West Virginia University, XP055509828, pp. i-102, pp. 52, para. 1—pp. 53, para. 1; pp. 55, para. 3; pp. 58, para. 3—pp. 59, para. 2; Figs. 4.1, 4.3.

Search Report dated Oct. 4, 2018 of the corresponding European patent application.

Office Action dated Jun. 11, 2019 of the corresponding Korean patent application.

Office Action dated Mar. 5, 2019 of the corresponding Japan patent application.

\* cited by examiner

BODY INFORMATION ANALYSIS APPARATUS AND BLUSH ANALYSIS METHOD THEREOF

BACKGROUND OF THE INVENTION

1. Technical Field

The technical field relates to an analysis apparatus and an analysis method, and specifically relates to a body information analysis apparatus and a blush analysis method thereof.

2. Description of Related Art

Applying cosmetics is an important one of multiple routine jobs for women. Generally, a user usually sits in front of the mirror for applying cosmetics, or uses apparatuses having the camera and the monitor (such as smart phones, tablets, etc.) to substitute the traditional mirror for applying cosmetics.

However, the user can only check and confirm whether the makeup is done evenly or the color is appropriated or not by his/her bare eyes, that's why some users with less experiences may face the problem in slow makeup speed or terrible makeup quality.

According to the problem, users in this technical field seriously need an auxiliary apparatus, which may assist the users to apply cosmetics quickly and also to optimize the quality of the makeup.

SUMMARY OF THE INVENTION

The invention is directed to a body information analysis apparatus and a blush analysis method thereof, which may analyze an image of a blush position of a user and guide the user when the user is applying cosmetics, so as to assist the user to apply cosmetics more quickly and accurately.

In one of the exemplary embodiments of the present invention, the blush analysis method comprises following steps:

a) capturing an external image through an image capturing module of the body information analysis apparatus;

b) performing positioning actions to each facial feature of a face and determining a face type of the face once the face is recognized from the external image by a processor of the body information analysis apparatus;

c) executing a corresponding positioning process by the processor according to the face type for finding positions of a left blush and a right blush on the face;

d) analyzing a first average color value of the left blush and a second average color value of the right blush by the processor;

e) comparing the first average color value and the second average color value with default color values, or comparing the first average color value with the second average color value, and generating a comparison result; and f) displaying the comparison result through a display module of the body information analysis apparatus.

In one of the exemplary embodiments of the present invention, the body information analysis apparatus comprises:

an image capturing module, for capturing an external image;

a display module; and a processor electrically connected with the image capturing module and the display module, recognizing the external image, and performing positioning actions to each facial feature of a face and determining a face type of the face once the face is recognized from the external image;

wherein, the processor executes a corresponding positioning process according to the face type for finding positions of a left blush and a right blush on the face, and analyzes a first average color value of the left blush and a second average color value of the right blush, and then compares the first average color value and the second average color value with default color values or compares the first average color value with the second average color value, and generates a comparison result;

wherein, the display module displays the comparison result.

In comparison with related art, each embodiment disclosed in the present invention may provide a face look for the user when he or she is applying cosmetics through the body information analysis apparatus, and the user may receive an image analysis upon his or her blush position, so as to apply cosmetics more quickly and accurately.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1:
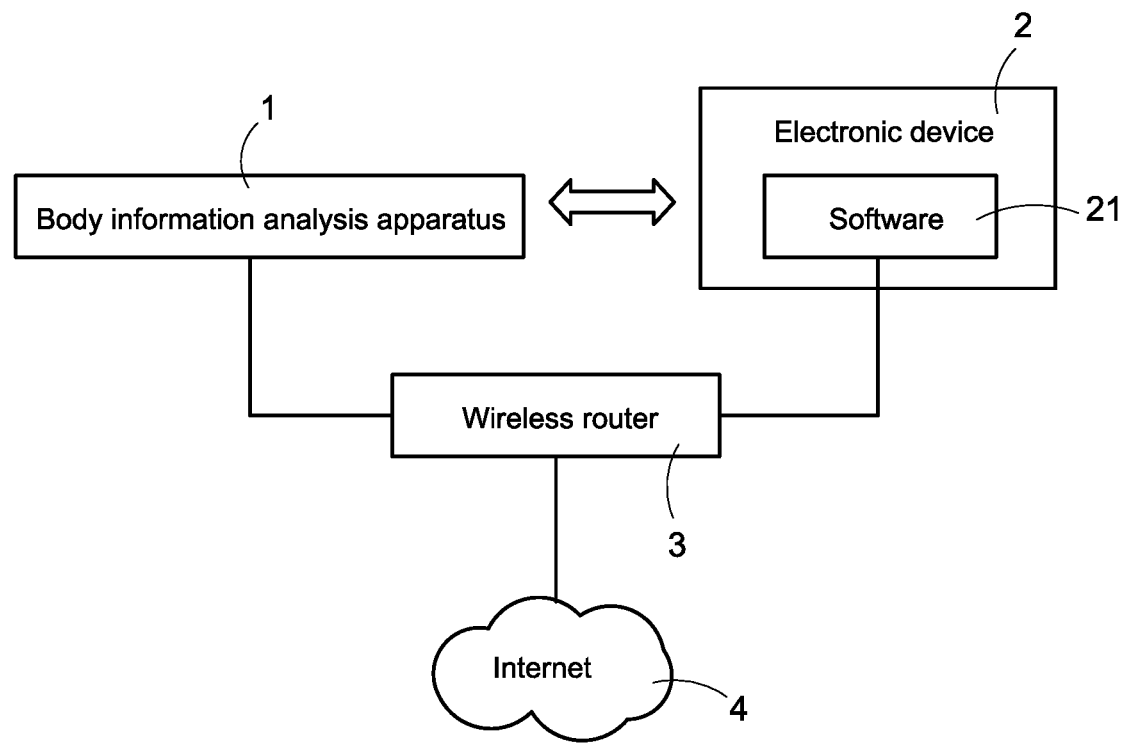
FIG. 1 is a schematic diagram of a system according to a first embodiment of the present invention.

FIG. 1 is a schematic diagram of a system according to a first embodiment of the present invention. The present invention discloses a body information analysis apparatus (referred to as the analysis apparatus 1 hereinafter). The analysis apparatus 1 is used to perform a blush analysis method (referred to as the analysis method hereinafter), which assists a user in making up blushes (also called "rouge") on his or her own face more quickly and accurately.

In one embodiment, the user may perform setting on the analysis apparatus 1 through operating an electronic device 2. In particular, if the analysis apparatus 1 and the electronic device 2 are connecting to same wireless router 3, they can establish a wireless connection through the wireless router 3. Besides, the analysis apparatus 1 and the electronic device 2 may pair or connect directly through other wireless communication protocols (e.g., Bluetooth pairing, Zigbee connecting, RF connection, etc.), so as to transmit data, commands and signals with each other.

As shown in FIG. 1, the electronic device 2 is installed with a software 21. In particular, the software 21 may interconnect with the analysis apparatus 1 (for example, the software 21 may be an application program created and provided by the manufacturer of the analysis apparatus 1). In the present invention, a user may operate the software 21 executed by the electronic device 2 for completing multiple setting actions on the analysis apparatus 1 (such as registering face information, setting default values, etc.).

In one embodiment, the analysis apparatus 1 may connect to the wireless router 3 arranged in same area, and connects to the Internet 4 through the wireless router 3. Therefore, the analysis apparatus 1 may perform firmware updating, data uploading, data downloading, etc. through the Internet 4. Besides, the analysis apparatus 1 may collect user's body information and transmit the body information to a remote computer (not shown) through the Internet 4. Therefore, the user may check the body information from a remote end, and an offsite backup purpose may also be accomplished.

Figure 2:
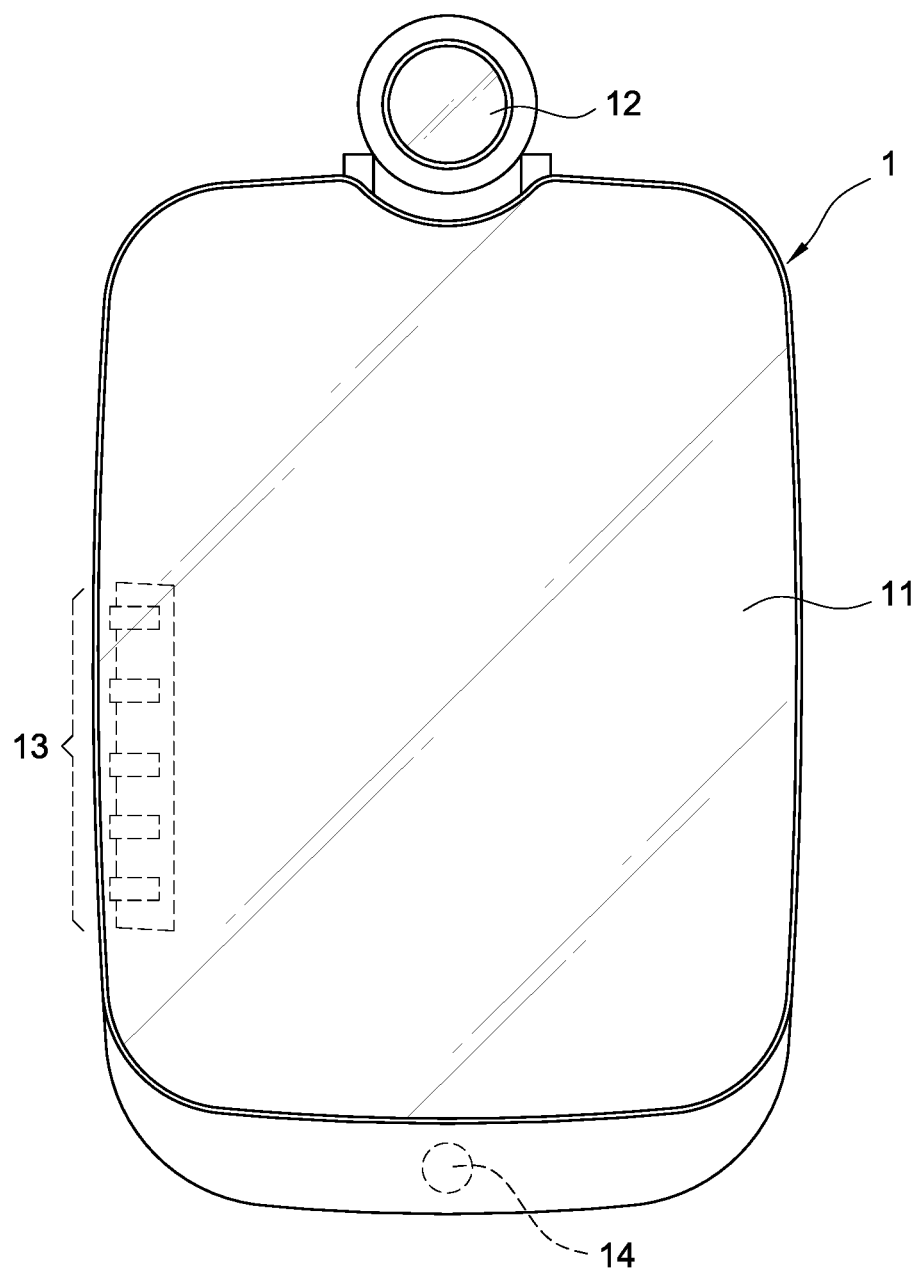
FIG. 2 is a schematic diagram of an analysis apparatus according to a first embodiment of the present invention.
Figure 3:
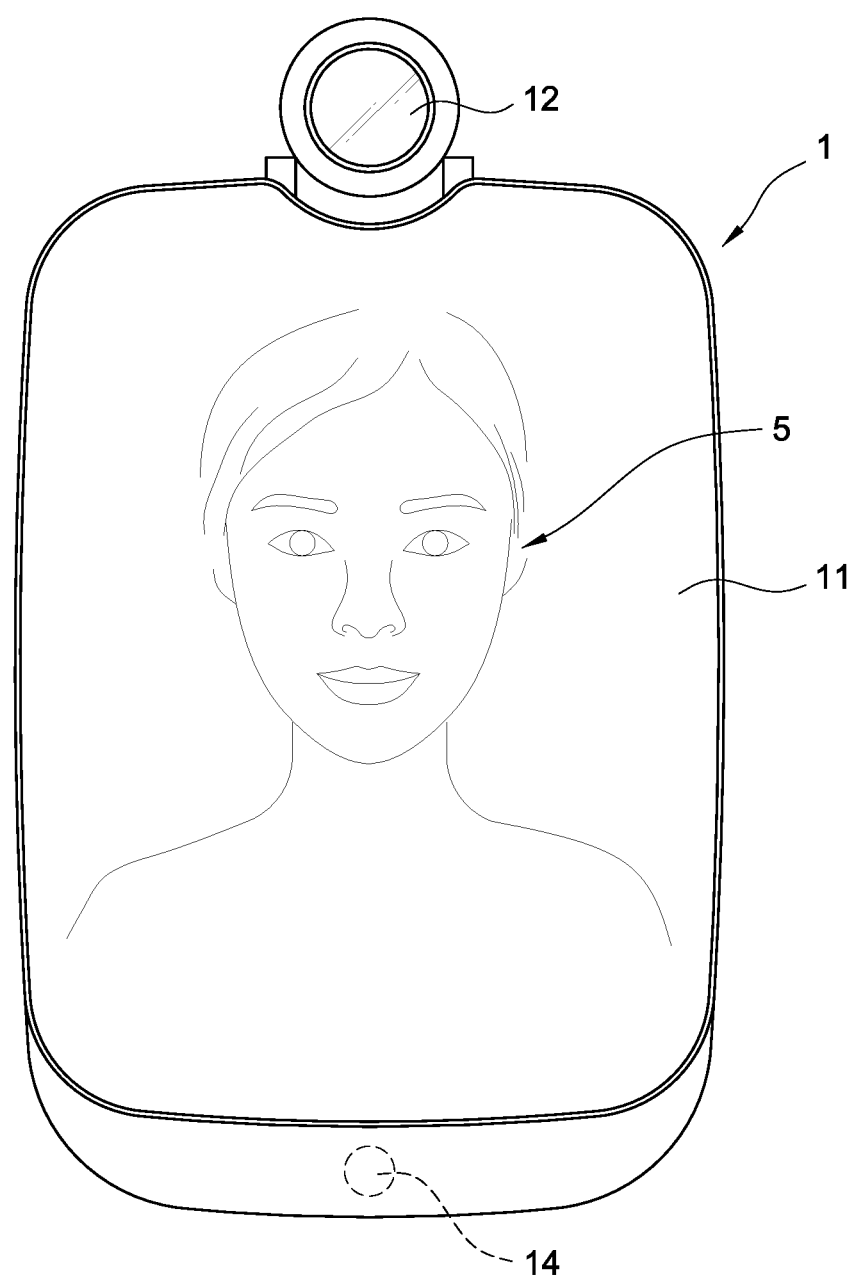
FIG. 3 is a schematic diagram of the analysis apparatus according to a second embodiment of the present invention.

Refers to FIG. 2 and FIG. 3, wherein FIG. 2 is a schematic diagram of an analysis apparatus according to a first embodiment of the present invention, and FIG. 3 is a schematic diagram of the analysis apparatus according to a second embodiment of the present invention. The analysis apparatus 1 in the present invention is basically arranged in the bedroom or the restroom of a user 5 and is used to inspect and analyze user's body information (e.g., the skin situation of the face, the neck, or the hands, etc.), so as to assist the user to apply cosmetics.

The analysis apparatus 1 includes a mirror screen 11. The analysis apparatus 1 displays a graphical user interface (GUI) through the mirror screen 11 for interacting with the user 5 while it is turned on. When the analysis apparatus 1 is turned off, the mirror screen 11 can also be deemed and used as a regular mirror for reflecting the face look of the user 5. One of the main objectives of the present invention is to assist the user 5 in applying cosmetics through the analysis apparatus 1. For doing so, the mirror screen 11 may simultaneously reflect the face look of the user 5 and display the GUI. Therefore, the analysis apparatus 1 may analyze the make-up of the user 5 while the user 5 is applying cosmetics for providing assistances to the user 5 (detailed described in the following).

In one embodiment, the mirror screen 11 may be a touch screen, and the user 5 may perform data input on the analysis apparatus 1 through the mirror screen 11.

The analysis apparatus 1 further includes an image capturing module 12, which is arranged on the analysis apparatus 1 and is adjustable for its setting angle. In one embodiment, the image capturing module 12 may capture high-resolution images for the user 5 (such as face images, neck images, hands images, etc.). Therefore, the analysis apparatus 1 may analyze body information and make-up progress of the user 5 through the captured images. In another embodiment, the image capturing module 12 may capture external messages (such as barcodes, QR codes, etc.), and the analysis apparatus 1 may obtain necessary data according to the content of the captured external messages.

The analysis apparatus 1 further includes multiple buttons 13. In one embodiment, the multiple buttons 13 may be physical buttons or touch keys, not limited thereto. The user 5 may operate the GUI (for example, controls the GUI to go back to a home page, to perform a pageup function, to perform a pagedown function, etc.), or leads the analysis apparatus 1 to quickly trigger corresponding functions (for example, turns on the mirror screen 11, turns off the mirror screen 11, turns on the image capturing module 12, etc.), by way of pressing the buttons 13.

The analysis apparatus 1 further includes one or more sensors 14 (such as temperature sensors, humility sensors, etc.). The sensors 14 are used to detect the environment values around the position where the analysis apparatus 1 is arranged. Therefore, the accuracy of the body information of the user 5 detected and analyzed by the analysis apparatus 1 may be enhanced in accordance with the sensor data. For an instance, if the sensors 14 comprise a pyroelectric infrared radial (PIR) sensor, it can detect whether the user 5 is entering the field of usage of the analysis apparatus 1 in any time. Therefore, the analysis apparatus 1 may leave the standby mode correspondingly for activating the image capturing module 12 for capturing the face image of the user 5 and performing the following analysis processes.

In another embodiment, the above sensors 14 may include a motion sensor. The analysis apparatus 1 may detect user's moving gesture (such as waving left, waving right, waving up, waving down, pushing forward, pulling backward, etc.) through the motion sensor. Therefore, the user 5 may perform data input on the analysis apparatus 1 through the moving gestures without physically touching the aforementioned mirror screen 11 or the buttons 13, so as to prevent the mirror screen 11 and the buttons 13 from retaining fingerprints.

Figure 4:
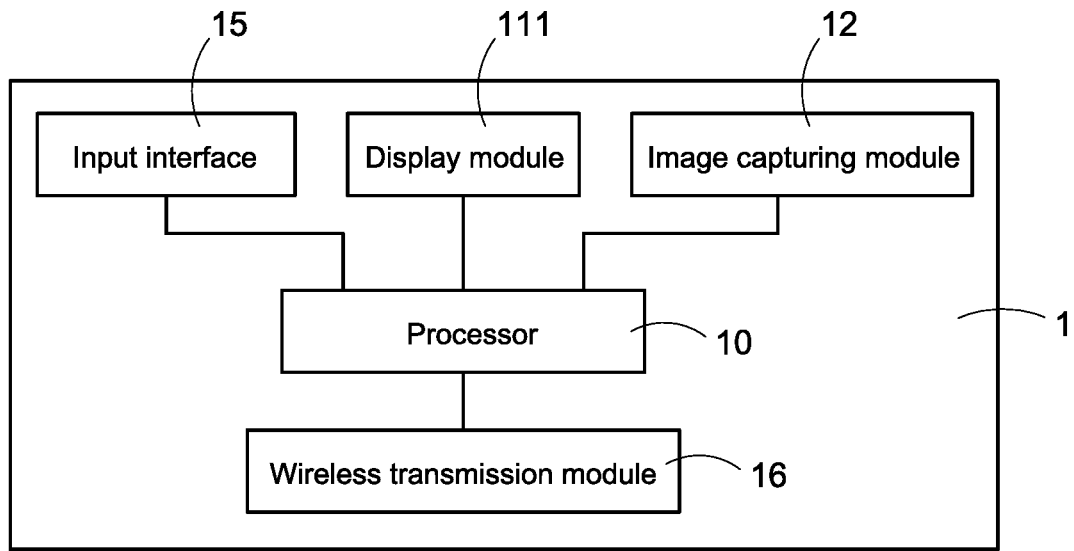
FIG. 4 is a block diagram of the analysis apparatus according to a first embodiment of the present invention.

FIG. 4 is a block diagram of the analysis apparatus according to a third embodiment of the present invention. As shown in FIG. 4, the analysis apparatus 1 mainly includes a processor 10, a display module 111, the image capturing module 12, an input interface 15, and a wireless transmission module 16, wherein the display module 111, the image capturing module 12, the input interface 15, and the wireless transmission module 16 are electrically connected with the processor 10.

In one embodiment, the image capturing module 12 may be a camera. The image capturing module 12 is used to capture external images and messages and provides the captured images and the captured messages to the analysis apparatus 1. The analysis apparatus 1 may perform recognitions on the user 5 through the captured images (for example, a face recognition, a neck recognition, a hand recognition, etc.) so as to analyze each facial feature of the user 5 (such as the face, the neck, the hand, etc.). Also, the analysis apparatus 1 may also perform relative setting actions through the content of the captured messages.

The display module 111 is used to display the aforementioned GUI. In one embodiment, the display module 111 is arranged inside the mirror screen 11. When the display module 111 is turned on, the light emitted from the display module 111 may penetrate through the mirror screen 11 and the GUI may be displayed right on the mirror screen 11. When the display module 111 is turned off, the user may regard and use the mirror screen 11 as a regular mirror. In one embodiment, the analysis apparatus 1 may adjust the light strength or the display area of the display module 111, thus the mirror screen 11 may simultaneously reflect the image of the user and also display the GUI thereon.

The analysis apparatus 1 may receive external input through the input interface 15, so the user may interact with the GUI or perform necessary settings on the analysis apparatus 1. In one embodiment, the input interface 15 may be the aforementioned sensors 14, so as to detect the gesture inputs from the user. In another embodiment, the input interface 15 may be the image capturing module 12, so as to capture the external images or the external messages. In a further embodiment, the input interface 15 may be the touch screen or the buttons 13, so as to receive input actions directly from the user. In another further embodiment, the input interface 15 may be a microphone, so as to receive external audio.

The wireless transmission module 16 assists the analysis apparatus 1 to connect to the Internet 4. In particular, the user may connect to the analysis apparatus 1 from a remote end through the Internet 4 to check each information recorded in the analysis apparatus 1 (such as the body information of the user) in any time.

The processor 10 is connected to the display module 111, the image capturing module 12, the input interface 15, and the wireless transmission module 16, and the processor 10 may include computer executable program codes (not shown). Upon executing the computer executable program codes, the processor 10 may control all the above modules of the analysis apparatus 1 and performs the analysis method of the present invention.

Figure 5:
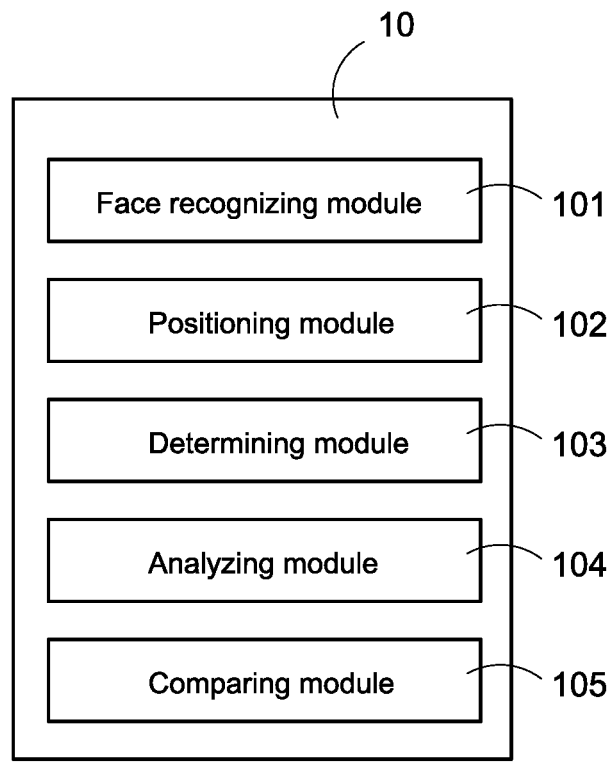
FIG. 5 is a schematic diagram of a processor according to a first embodiment of the present invention.

Refers to FIG. 5, which is a schematic diagram of a processor according to a first embodiment of the present invention. In particular, the processor 10 accomplishes each function of the analysis method of the present invention through executing the aforementioned computer executable program codes, and the computer executable program codes may be divided into multiple function modules set forth below according to different functions:

1. A face recognizing module 101, which is used to recognize the external image captured by the image capturing module 12, so as to determine whether a face is present in the external image;

2. A positioning module 102, which is used to perform positioning actions on the face presented in the external image through an algorithm, so as to obtain the positions of each facial feature of the face. Also, the positioning module 102 further determines a face type of the face;

3. A determining module 103, which is used to execute corresponding positioning process according to the face type of the face determined by the positioning module 102, so as to find the exact positions of blushes of the face;

4. An analysing module 104, which is used to execute image analysis to the found blush positions, so as to obtain the current condition of the blushes of the user (including the condition of a left-side blush and the condition of a right-side blush, such as the brightness of the color, the distribution of the color, etc.); and 5. A comparing module 105, which is used to compare the condition of the current left-side blush with the condition of the current right-side blush of the user and informs the user about the comparison result (e.g., the color of the left-side blush is more brighter than that of the right-side blush, the color of the two blushes are not even, etc.), so as to provide make-up assistances for the user.

In other embodiment, the comparing module 105 may compare the condition of the current blushes of the user with default values instead of comparing the left-side blush with the right-side blush (detailed described in the following). Therefore, the analysis apparatus 1 may ensure that the completed blushes of the user are closer to a preferred feature (i.e., a feature selected by the user, or a default feature preset by the analysis apparatus 1).

In this embodiment, the positioning module 102 may recognize at least six face types including an oval face, a round face, a square face, a long face, an inverted triangular face, and a diamond face after the positioning actions, but not limited thereto.

The above determining module 103 may perform a first positioning process on the face to find the blush positions (including the position of the left-side blush and the position of the right-side blush) if the face is recognized as an oval face, may perform a second positioning process on the face to find the blush positions if the face is recognized as a round face or a square face, may perform a third positioning process on the face to find the blush positions if the face is recognized as a long face, and may perform a fourth positioning process on the face to find the blush positions if the face is recognized as an inverted triangular face or a diamond face. However, the above descriptions are just few embodiments of the present invention, not intended to limit the scope of the present invention.

When the user is facing the analysis apparatus 1, the analysis apparatus 1 may obtain an external image that includes the image of the user through the image capturing module 12. Next, the analysis apparatus 1 fetches a face image of the user from the external image through the face recognizing module 101 of the processor 10, and recognizes the face type of the face image through the positioning module 102 of the processor 10. Next, the analysis apparatus 1 may perform corresponding positioning process according to the face type through the determining module 103 of the processor 10, so as to fine the blush positions of the face image.

Next, the analysis apparatus 1 executes an algorithm through the analyzing module 104 of the processor 10, so as to analyze the conditions of a left-side blush and a right-side blush of the face image. Also, the analysis apparatus 1 may compare the condition of the left-side blush with the condition of the right-side blush through the comparing module 105 of the processor 10.

After comparing, the analysis apparatus 1 may reflect the face look of the user through the mirror screen 11, and simultaneously displays the comparison result of the comparing module 105 through the display module 111. Therefore, the user may apply cosmetics according to the face look reflected by the mirror screen 11 and also the comparison result displayed by the mirror screen 11.

Figure 6A:
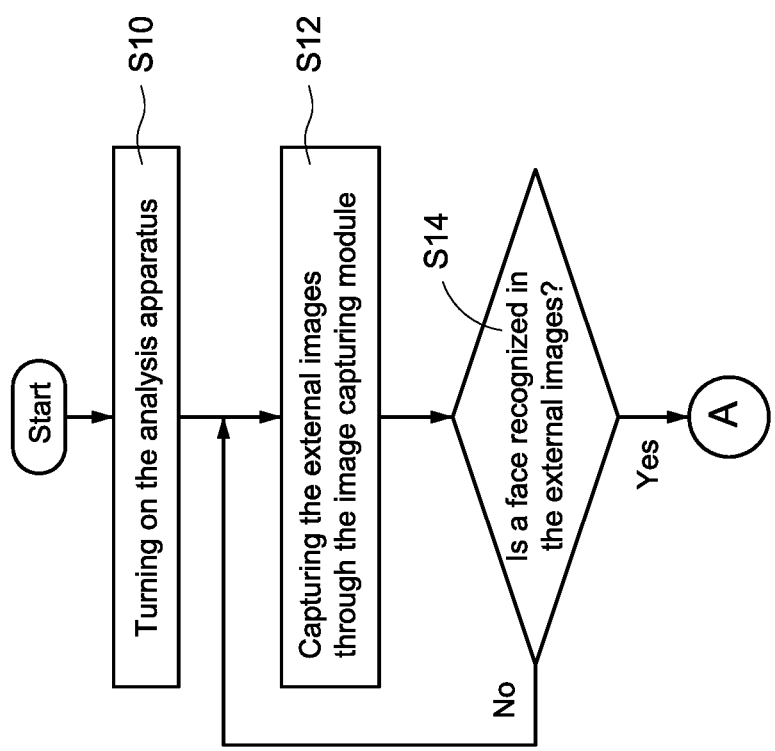
FIG. 6A is a first flowchart for analyzing the blush according to a first embodiment of the present invention.
Figure 6B:
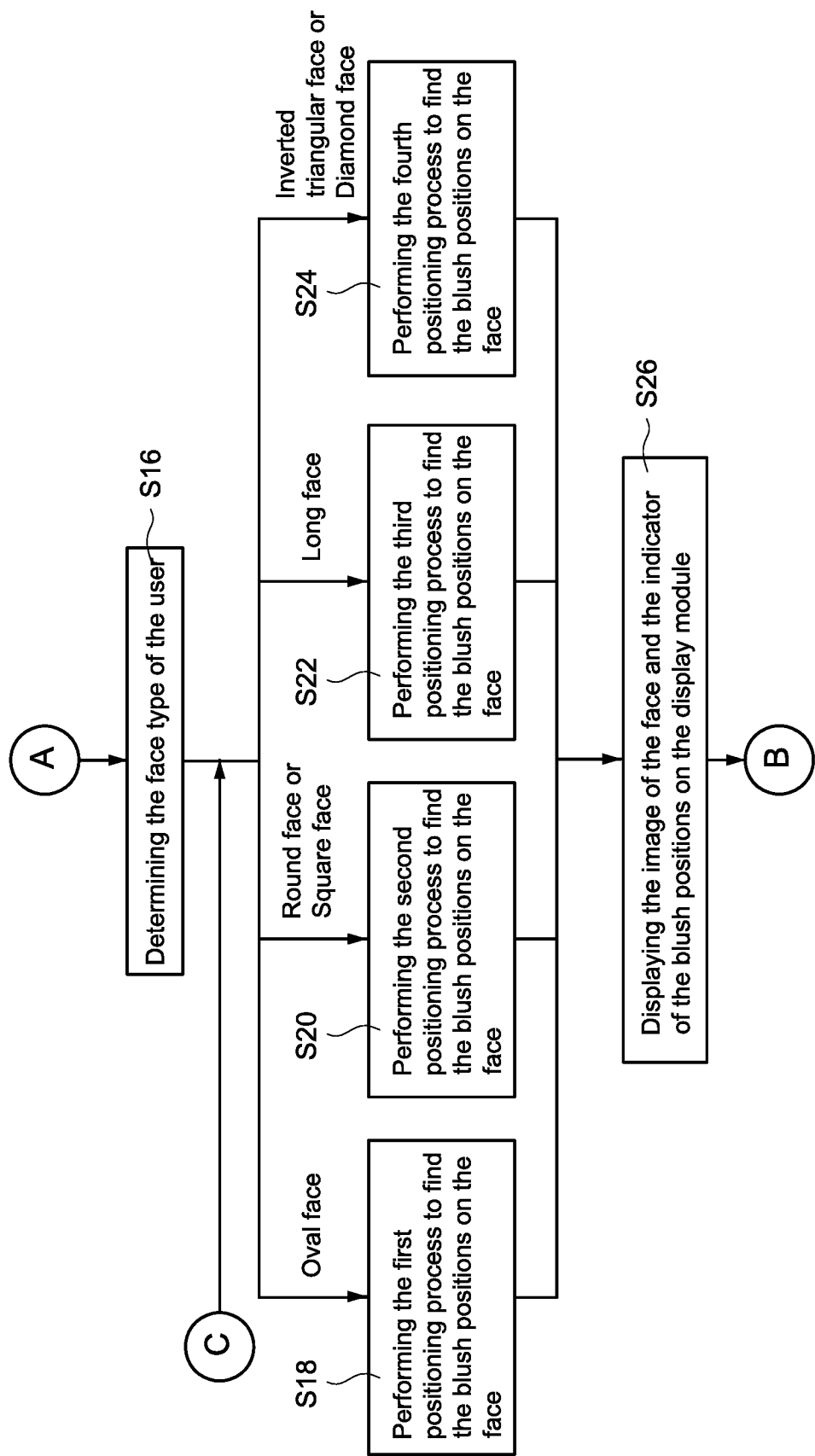
FIG. 6B is a second flowchart for analyzing the blush according to the first embodiment of the present invention.

FIG. 6A is a first flowchart for analyzing the blush according to a first embodiment of the present invention. FIG. 6B is a second flowchart for analyzing the blush according to the first embodiment of the present invention.

Figure 6C:
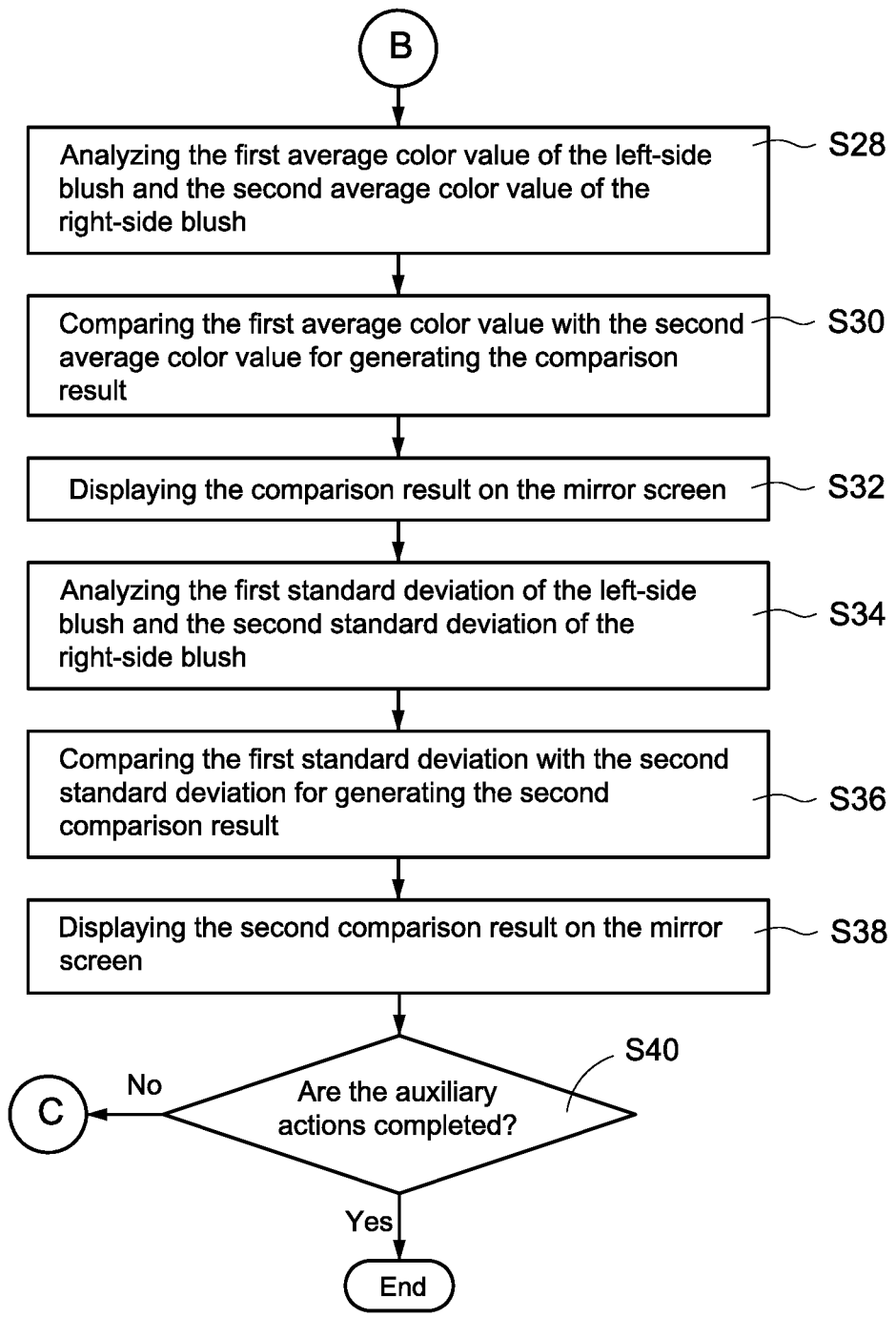
FIG. 6C is a third flowchart for analyzing the blush according to the first embodiment of the present invention.

FIG. 6C is a third flowchart for analyzing the blush according to the first embodiment of the present invention. FIG. 6A to FIG. 6C are used to describe each step of the analysis method of the present invention, and these steps are in particular adopted by the analysis apparatus 1 as shown in FIG. 1 to FIG. 5. More specific, the analysis apparatus 1 executes aforementioned computer executable program codes (i.e., the above function modules 101-105) through the processor 10 for accomplishing each step as described in the following.

As shown in FIG. 6A, to perform the analysis method through the analysis apparatus 1 of the present invention for assisting the user in applying cosmetics, the user first turns the analysis apparatus 1 on (step S10). In one embodiment, the user may trigger the touch screen or the buttons 13 to turn the analysis apparatus 1 on. In another embodiment, the analysis apparatus 1 may automatically enter a standby mode after receiving power, and the user may input gestures through the image capturing module 12 or the sensors 14 for activating the analysis apparatus 1 from the standby mode, but not limited thereto.

In particular, the analysis apparatus 1 may include multiple modes capable of different functions. In one embodiment, the analysis apparatus 1 is automatically entering an auxiliary mode for assisting the user in applying cosmetics after it is turned on. In another embodiment, the analysis apparatus 1 may automatically enter the standby mode after it is turned on, and enters the auxiliary mode after receiving the corresponding command from the user.

After being turned on, the analysis apparatus 1 keeps capturing external images through the image capturing module 12 (step S12), and the processor 10 of the analysis apparatus 1 keeps determining whether a face is present in the captured external images (step S14). In one embodiment, the processor 10 obtains an external image from the image obtaining mdoule 12, and performs a face recognition on the external image through the face recognizing module 101, so as to determine whether a face is present in the external image or not.

If no face is present in the external image, the analysis apparatus 1 re-executes the step S12 and the step S14 for continually capturing and analyzing external images. If only a bed, a door, or a chair is present in the external image (means there's no human exists in the bedroom), or only the body or the back of the user is present in the external image (means the user doesn't want to use the analysis apparatus 1), the analysis apparatus 1 will not perform the analysis method of the present invention.

As shown in FIG. 6B, if the processor 10 determines that a face is present in the external image, it then performs positioning actions on each part of the face (basically on the facial features of the user) and determines the face type of the face of the user (step S16). In one embodiment, the processor 10 may further determine if the size of the face is larger than a specific ratio or not (for example, the face occupies the external image more than 40%) after the face is determined present in the external image. In the scenario, the process 10 performs the positioning actions on the face and determines the face type only if the size of the face in the external image is larger than the specific ratio.

In one embodiment, the processor 10 renders a face image of the face to the aforementioned positioning module 102 after the face is determined present in the external image, and performs the positioning actions on the face for recognizing the face type of the face through the positioning module 102. In this embodiment, the positioning module 102 may determine the face type according to several parameters of the face, such as the relative positions of each facial feature of the face, and the ratio of each facial feature of the face. Therefore, the positioning module 102 may recognize several face types, at least including an oval face, a round face, a square face, a long face, an inverted triangular face, a diamond face, etc.

It should be noted that the position module 102 in the embodiment may perform the positioning actions on each facial feature of the face through a Dlib Face Landmark system, but not limited thereto.

Figure 7:
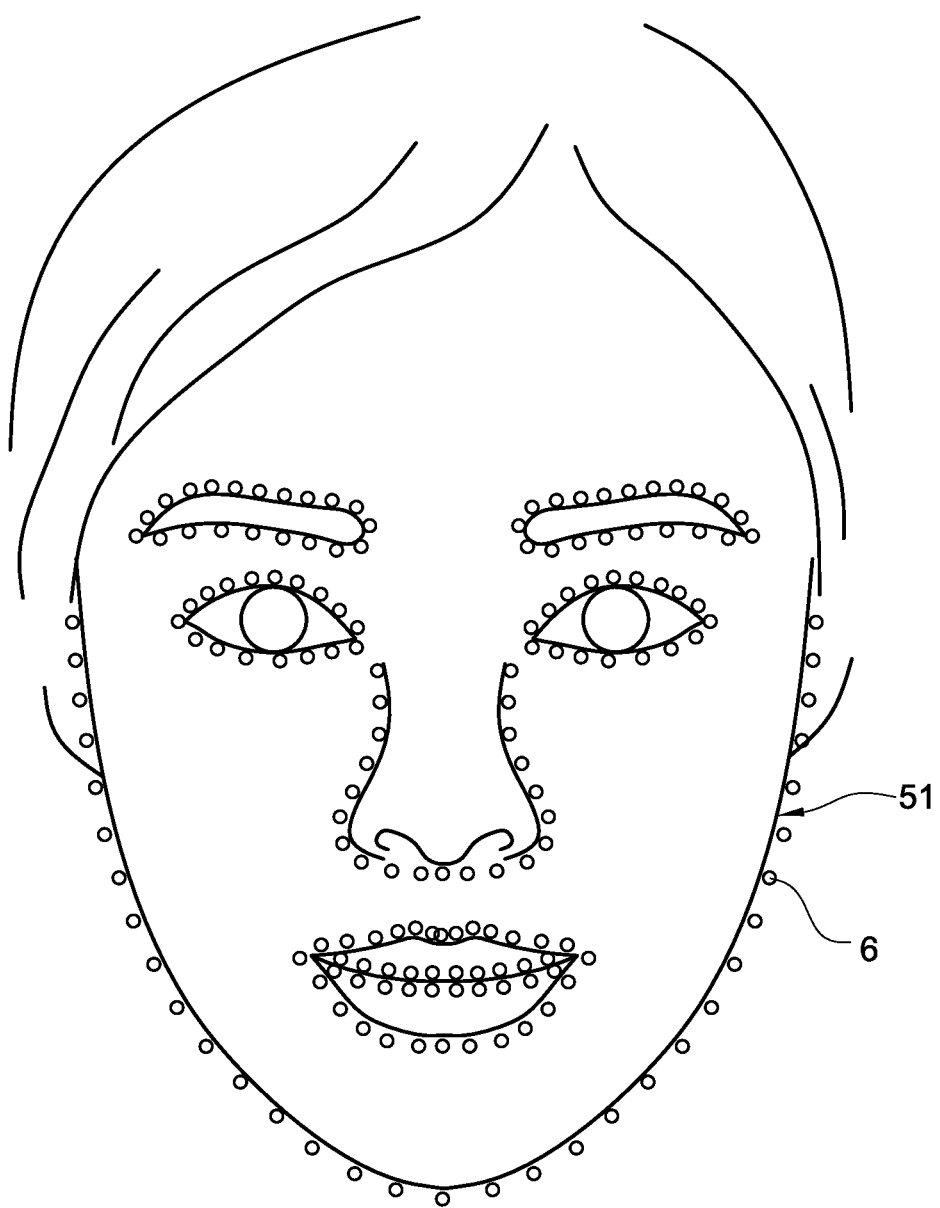
FIG. 7 is a schematic diagram for positioning a face.

FIG. 7 is a schematic diagram for positioning a face. When determining that a face is present in the external image, the processor 10 further performs analysis on the image of a face 51 through the Dlib Face Landmark system. The Dlib Face Landmark system is a common technical solution in the technical field, which can generate multiple positioning points 6 in the image of the face 51 after completing the analysis (such as 198 positioning points). Therefore, the Dlib Face Landmark system may figure out the positions of each facial feature of the face 51 according to the serial number, the shape, the order, etc. of the multiple positioning points 6 for accomplishing the positioning actions.

Also, the positioning module 102 may further determine the relative positions and the relative ratios among each facial feature of the face 51 according to the positions of the multiple positioning points 6, so as to figure out the face type of the face 51.

Refer back to FIG. 6B. After the step S16, the processor 10 may identify the face type of the aforementioned face and apply a corresponding positioning process according to the face type, so as to find the blush positions on the face, and performs analysis to the current blushes of the user. In the embodiment, the processor 10 performs a first positioning process when identifying the face type is an oval face, performs a second positioning process when identifying the face type is a round face or a square face, performs a third positioning process when identifying the face type is a long face, and performs a fourth positioning process when identifying the face type is an inverted triangular face or a diamond face.

In a first embodiment, the processor 10 renders the identified face type to the aforementioned determining module 103, and the determining module 103 performs the first positioning process if the face type is identified as the oval face, so as to find the blush positions on the face through the first positioning process (step S18). The blush positions in the embodiment include the position of the left-side blush and the position of the right-side blush upon the face.

In a second embodiment, the processor 10 renders the identified face type to the determining module 103, and the determining module 103 performs the second positioning process if the face type is identified as the round face or the square face, so as to find the blush positions on the face through the second positioning process (step S20).

In a third embodiment, the processor 10 renders the identified face type to the determining module 103, and the determining module 103 performs the third positioning process if the face type is identified as the long face, so as to find the blush positions on the face through the third positioning process (step S22).

In a fourth embodiment, the processor 10 renders the identified face type to the determining module 103, and the determining module 103 performs the fourth positioning process if the face type is identified as the inverted triangular face or the diamond face, so as to find the blush positions on the face through the fourth positioning process (step S24).

It should be noted that one of multiple objectives of the present invention is to assist the user in applying cosmetics for the blushes, after the blush positions are found, the analysis apparatus 1 may optionally display, through the aforementioned display module 111 (and the mirror screen 11), the image of the face and an indicator of the blush positions (step S26), and the indicated blush positions are overlapped with the image of the face. Therefore, the user may check and ensure the positions upon the face for making up the blushes right through the mirror screen 11.

See FIG. 6C. The processor 10 then analyzes a first average color value of the left-side blush and a second average color value of the right-side blush according to the images of the left-side blush and the right-side blush (step S28).

In one of the exemplary embodiments, the processor 10 obtains the images of the left-side blush and the right-side blush according to the blush positions fetched in the aforementioned step S18, step S20, step S22, and step S24. The processor 10 renders the images to the aforementioned analyzing module 104 for the analyzing module 104 to analyze the first average color value of the left-side blush and the second average color value of the right-side blush. In this embodiment, the analyzing module 104 may apply multiple image analyzing algorithms of the related art for analyzing the first average color value and the second average color value according to the images of the left-side blush and the right-side blush.

In particular, the calculation of the above average color values may be performed by the processor 10 through analyzing and indicating the obtained blush images by different color space formats. The above color space formats may be RGB color space, HSV color space, HSL color space, etc., not limited thereto. According to the analysis method adopted by the processor 10, the processor 10 may use two or more color space formats simultaneously, or may take a measure of weight therefrom for analyzing.

For example, if the adopted color space format is the HSV color space, the color of each pixel of the obtained blush images may be indicated by multiple measures of weight including "Hue", "Saturation", and "Value". If the adopted color space format is the RGB color space, the color of each pixel of the obtained blush images may be indicated by multiple measures of weight including "Red", "Green", and "Blue".

After the step S28, the processor 10 further compares the first average color value with the second average color value for generating a comparison result (step S30). In one embodiment, the processor 10 renders the first average color value and the second average color value to the aforementioned comparing module 105 for the comparing module 105 to determine whether the condition of the left-side blush is equal to or similar to the condition of the right-side blush (e.g., if the colors and brightness are identical or similar). Therefore, it may ensure the left blush and the right blush the user applied may be about the same.

In another embodiment, the processor 10 may obtain default color values (including a default color value for the left-side blush and another default color value for the right-side blush). In the above step S30, the processor 10 may compare the first and the second average color values with the default color values through the comparing module 105. Therefore, the user can be informed about the difference between the condition of the current blushes and the condition of preferred blushes (i.e., the condition present by the default color values).

In the embodiment, the processor 10 may pre-store the above default color values for being compared with the first and the second average color values in the step S30. Otherwise, the processor 10 may also pre-store one or multiple compared images (such as augmented reality (AR) images). The processor 10 may analyze the compared images before the step S30 for obtaining the default color values from the compared images, and then compares the obtained default color values with the first and the second average color values in the step S30.

In another embodiment, the user may select a specific blush product or a specific blush effect pre-stored in the analysis apparatus 1. Otherwise, the user may input a desired blush product to the analysis apparatus 1 for the analysis apparatus 1 to generate corresponding effect automatically. The aforementioned AR images are generated by the analysis apparatus 1 through combining the user image captured by the image capturing module 12 with the effect selected by the user in advance and overlapped onto the blush positions of the user image. Furthermore, the user may store the corresponding effect and/or the AR images to the analysis apparatus 1 if the selected effect satisfies the user.

In particular, the analysis apparatus 1 in the above embodiment may be embedded with multiple AR images while it's produced, and the user may select one of the multiple AR images as a compared image through the input interface 15. Besides, the user may input favorite compared image(s) to the analysis apparatus 1 through I/O devices or through the Internet 4 for adding the type and the amount of the compared images. In this embodiment, the compared images are face images that respectively correspond to different face types.

The aforementioned default color values may be standard color or standard brightness. In one embodiment, the default color values are obtained by the processor 10 through analyzing the compared image(s), and the standard color and the standard brightness are the color and the brightness presented in the face image of the compared image(s). In another embodiment, the default color values are pre-stored in the analysis apparatus 1; the standard color and the standard brightness are preferred color and preferred brightness preset by the user. In a further embodiment, the analysis apparatus 1 may download user preferred make-up through the Internet 4 and performs analysis on the downloaded make-up, so as to generate the aforementioned default color values.

After the step S30, the analysis apparatus 1 may display the comparison result on the mirror screen 11 through the display module 111 (step S32). The user may obtain the condition about the current blushes right on the mirror screen 11 (for example, the left-side blush is brighter than the right-side blush, the right-side blush is brighter than the standard brightness, etc.), so as to be served for assistances by the analysis apparatus 1.

In one embodiment, the first average color value, the second average color value, and the default color values mentioned above are pixel values within 0 to 255, the comparison result is a percentage, and the comparing module 105 generates the comparison result through executing the formula:

$$\frac{|\text{first average color value} - \text{second average color value}|}{255} * 100\%,$$

or generates the comparison result through executing the another formula:

$$\frac{|\text{default color values} - \text{average color values}|}{255} * 100\%.$$

However, the above descriptions are only few embodiments of the present invention, not intended to limit the scope of the present invention.

In one embodiment, the processor 10 further analyzes a first standard deviation (SD) of the left-side blush and a second standard deviation of the right-side blush according to the images of the left-side blush and the right-side blush (step S34).

In one embodiment, the processor 10 renders the images of the left-side blush and the right-side blush to the analyzing module 104 for the analyzing module 104 to analyze the first standard deviation and the second standard deviation. Similarly, the analyzing module 104 may apply multiple image analyzing algorithms of the related art to analyze the first and the second standard deviation according to the images of the left-side blush and the right-side blush.

After step S34, the processor 10 compares the first standard deviation with the second standard deviation for generating a second comparison result (step S36). In one embodiment, the processor 10 directly renders the first standard deviation and the second standard deviation to the aforementioned comparing module 105 for the comparing module 105 to determine whether the distributed condition of the left-side blush is equal to or similar to the distributed condition of the right-side blush (i.e., if the blush distributions are even or not).

In another embodiment, the processor 10 may perform image analysis on the aforementioned compared image through the analyzing module 104 for obtaining default standard deviations (including the default standard deviation of the left-side blush and the default standard deviation of the right-side blush). Then, the processor 10 compares the first and the second standard deviations with the default standard deviations through the comparing module 105 for generating the second comparison result.

In a further embodiment, the processor 10 pre-stores the default standard deviations by the comparing module 105, and renders the first standard deviation and the second standard deviation to the comparing module 105 after the step S34. The comparing module 105 may compare the first and the second standard deviations with the pre-stored default standard deviations for generating the second comparison result.

After the step S36, the analysis apparatus 1 may display the second comparison result on the mirror screen 11 through the display module 111 (step S38). The user may check the conditions of the current blushes and proceed with repairing actions to which are not even.

It should be noted that the step S28 to the step S32, and the step S34 to the step S38, are not having an execution order. The analysis apparatus 1 may alternatively calculate and display the comparison result or the second comparison result first, or calculate and display both the comparison result and the second comparison result simultaneously through multiplex processing, it is not limited in the step order as shown in FIG. 6C.

In one embodiment, the standard deviations are similar to the aforementioned average color values, which may be pixel values within 0 to 255. The second comparison result is similar to the aforementioned comparison result, which may be a percentage. In this embodiment, the comparing module 105 generates the second comparison result through executing the formula:

$$\frac{|\text{first standard deviation} - \text{second standard deviation}|}{255} * 100\%,$$

or generates the second comparison result through executing another formula:

$$\frac{|\text{default standard deviations} - \text{standard deviations}|}{255} * 100\%.$$

However, the above descriptions are only few embodiments of the present invention, not intended to limit the scope of the present invention.

Next, the analysis apparatus 1 determines whether the auxiliary actions provided for the user are completed (step S40). Before the auxiliary actions are completed, the analysis apparatus 1 re-executes the step S18 to the step S38 for continually obtaining the images and the positions of the left-side blush and the right-side blush, analyzing the first average color value, the second average color value, the first standard deviation, and the second standard deviation, and comparing, generating and displaying the comparison result and the second comparison result. Otherwise, once the auxiliary actions are all completed, the analysis apparatus 1 terminates the analysis method. Through re-executing the aforementioned step S18 to step S38, the analysis apparatus 1 and the analysis method of the present invention may accomplish a real-time make-up auxiliary function.

For an instance, the analysis apparatus 1 may perform analysis on the face 51 of the user, and display the comparison result for indicating that the color of the left-side blush of the user is 5% darker than that of the right-side blush. According to the comparison result, the user may repair the left-side blush. In the middle of the repairing, the analysis apparatus 1 keeps analyzing the face 51 of the user, and it adjusts the comparison result for indicating that the color of the left-side blush of the user is now 3% darker than that of the right-side blush.

According to the adjusted comparison result, the user may keep repairing the left-side blush. Still the analysis apparatus 1 keeps analyzing the face 51 of the user. Next, the analysis apparatus 1 again adjusts the comparison result for indicating that the color of the left-side blush of the user is now 1.5% darker than that of the right-side blush, and so on. Therefore, the user may keep repairing the blushes until the color/brightness of the blushes are identical or similar.

In one embodiment, the analysis apparatus 1 in the step S40 is to determine whether the comparison result (and the second comparison result) complies with a completion standard or not. For example, the analysis apparatus 1 may determine whether the first average color value is equal to or similar to the second average color value according to the comparison result, and determine whether the first standard deviation is equal to or similar to the second standard deviation according to the second comparison result, and the analysis apparatus 1 may determine that the comparison result (and the second comparison result) complies with the completion standard once the first average color value is equal to or similar to the second average color value and the first standard deviation is equal to or similar to the second standard deviation.

In another embodiment, the analysis apparatus 1 in the step S40 is to determine whether the analysis apparatus 1 is turned off or not. In this embodiment, the analysis apparatus 1 may re-execute the step S18 to the step S38 until it is turned off, and the analysis apparatus 1 may terminate the analysis method after that. Therefore, the analysis apparatus 1 may keep providing the real-time make-up auxiliary function while it is on.

Figure 8A:
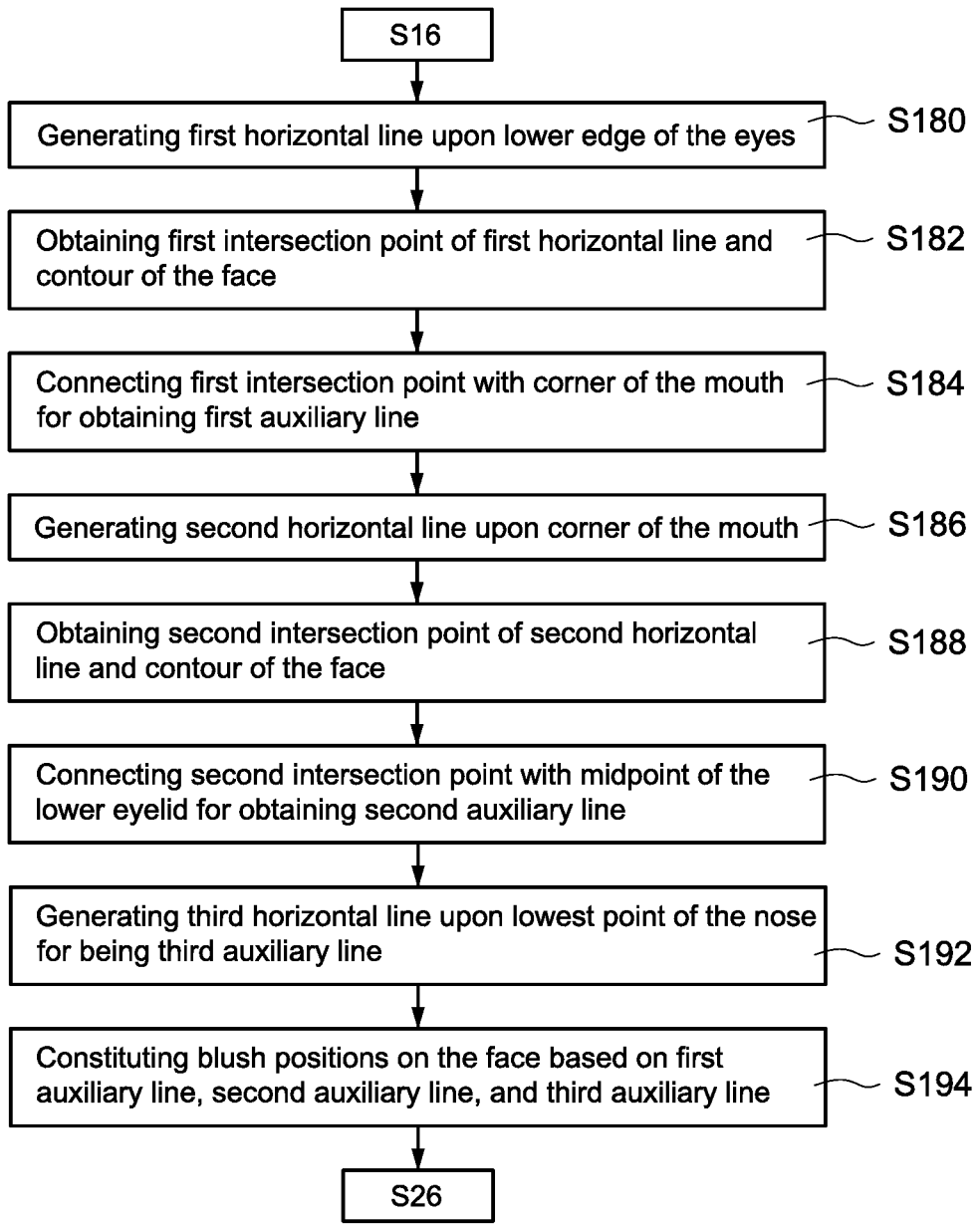
FIG. 8A is a flowchart for positioning the blushes according to a first embodiment of the present invention.
Figure 8B:
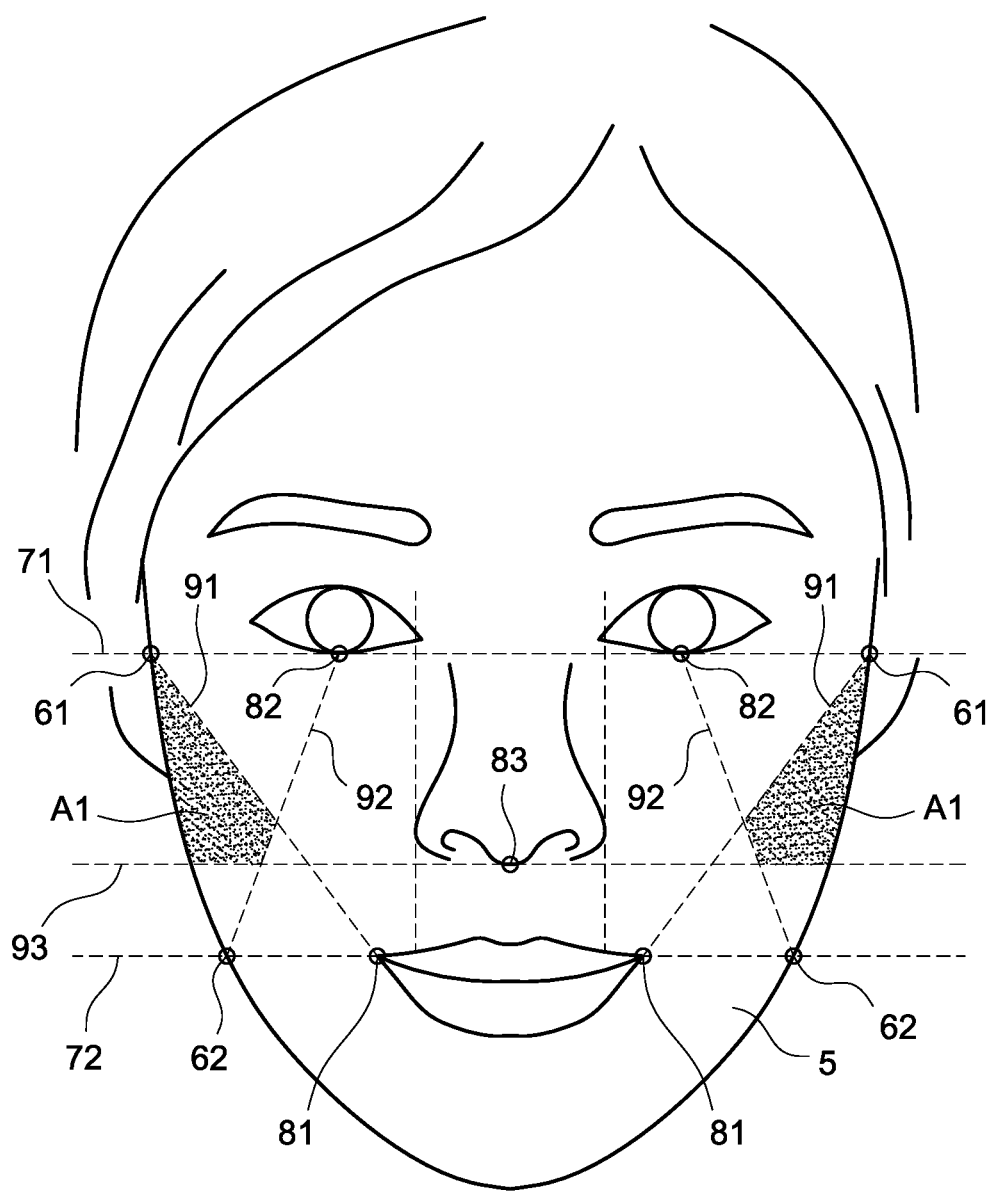
FIG. 8B is a schematic diagram showing blush positions according to the first embodiment of the present invention.

FIG. 8A is a flowchart for positioning the blushes according to a first embodiment of the present invention. FIG. 8B is a schematic diagram showing blush positions according to the first embodiment of the present invention. FIG. 8A is used to describe how the determining module 103 finds the blush positions through the first positioning process in the above step S18 once the face type of the user is recognized as an oval face by the positioning module 102 in the above step S16. More specific, the first positioning process is composed of the computer executable program codes recorded by the processor 10, and the determining module 103 may perform each step shown in FIG. 8A while executing the first positioning process.

The following paragraphs are describing the first positioning process in company with FIG. 8B.

First, the determining module 103 generates a first horizontal line 71 upon a lower edge of the eyes (step S180), and obtains a first intersection point 61 of the first horizontal line 71 and a contour of the face (step S182). In particular, the first intersection point 61 may include a left-first intersection point of the first horizontal line 71 and a left contour of the face and a right-first intersection point of the first horizontal line 71 and a right contour of the face.

Next, the determining module 103 connects the first intersection point 61 with a corner of the mouth 81 of the face for obtaining a first auxiliary line 91 (step S184). In particular, the first auxiliary line 91 may include a left auxiliary line linked from the left-first intersection point to a left corner of the mouth and a right auxiliary line linked from the right-first intersection point to a right corner of the mouth.

Next, the determining module 103 generates a second horizontal line 72 upon said corner of the mouth 81 (step S186), wherein the second horizontal line 72 is parallel with both the left corner and the right corner of the mouth of the face. Also, the determining module 103 obtains a second intersection point 62 of the second horizontal line 72 and the contour of the face (step S188). In particular, the second intersection point 62 may include a left-second intersection point of the second horizontal line 72 and the left contour of the face and a right-second intersection point of the second horizontal line 72 and the right contour of the face.

Next, the determining module 103 connects the second intersection point 62 with a midpoint of a lower eyelid 82 for obtaining a second auxiliary line 92 (step S190). In particular, the second auxiliary line 92 may include a left auxiliary line linked from the left-second intersection point to a midpoint of a left eyelid and a right auxiliary line linked from the right-second intersection point to a midpoint of a right eyelid.

Further, the determining module 103 generates a third horizontal line upon a lowest point of the nose 83 of the face which is deemed a third auxiliary line 93 (step S192). In particular, the third auxiliary line 93 may include a left auxiliary line extended from the nose to the left and a right auxiliary line extended from the nose to the right. Therefore, the determining module 103 may constitute blush positions A1 on the face based on the first auxiliary line 91, the second auxiliary line 92, and the third auxiliary line 93 (step S194).

More specific, the blush positions A1 may include a left-side blush position A1 constituted by the first to the third auxiliary lines 91-93 on the left side, and a right-side blush position A1 constituted by the first to the third auxiliary lines 91-93 on the right side. In particular, the blush positions A1 are the areas surrounded by the first auxiliary line 91, the second auxiliary line 92, the third auxiliary line 93, and the contour of the face.

Figure 9A:
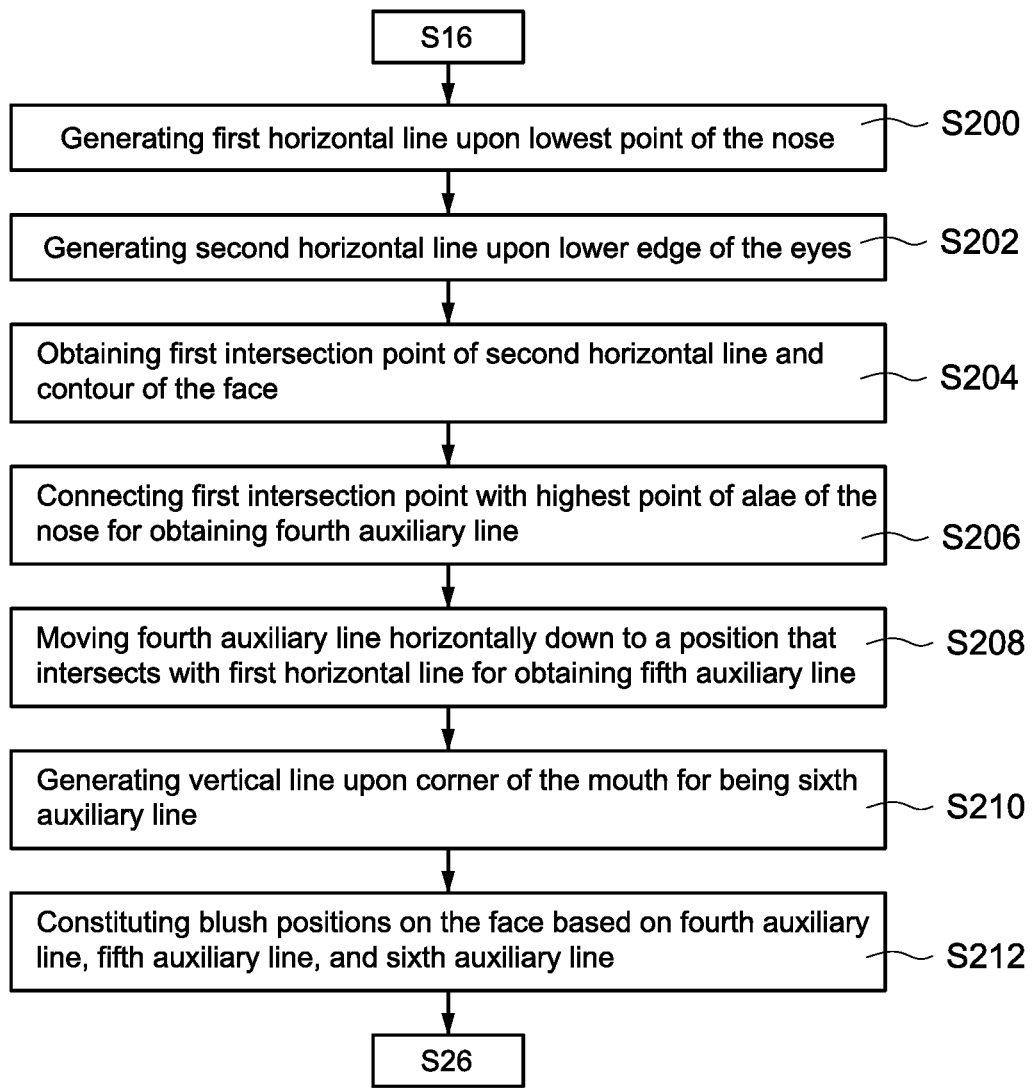
FIG. 9A is a flowchart for positioning the blushes according to a second embodiment of the present invention.
Figure 9B:
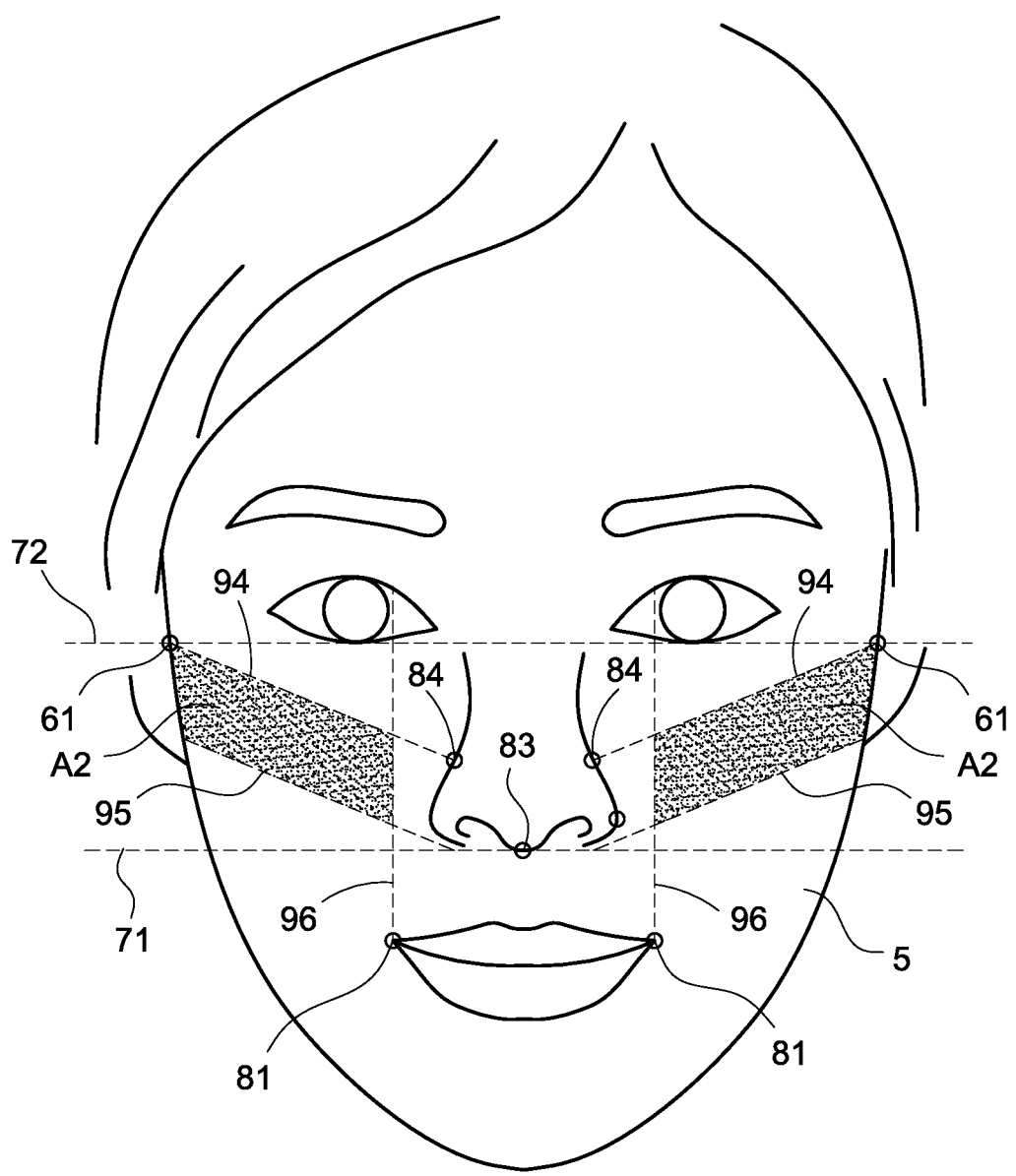
FIG. 9B is a schematic diagram showing blush positions according to the second embodiment of the present invention.

FIG. 9A is a flowchart for positioning the blushes according to a second embodiment of the present invention. FIG. 9B is a schematic diagram showing blush positions according to the second embodiment of the present invention. FIG. 9A is used to describe how the determining module 103 finds the blush positions through the second positioning process in the above step S20 once the face type of the user is recognized as a round face or a square face by the positioning module 102 in the above step S16. More specific, the second positioning process is composed of the computer executable program codes recorded by the processor 10, and the determining module 103 may perform each step shown in FIG. 9A while executing the second positioning process.

The following paragraphs are describing the second positioning process in company with FIG. 9B.

First, the determining module 103 generates a first horizontal line 71 upon a lowest point of the nose 83 of the face (step S200). Next, the determining module 103 generates a second horizontal line 72 upon a lower edge of the eyes (step S202), and obtains a first intersection point 61 of the second horizontal line 72 and a contour of the face (step S204). In particular, the first intersection point 61 may include a left-first intersection point of the second horizontal line 72 and a left contour of the face and a right-first intersection point of the second horizontal line 72 and a right contour of the face.

Next, the determining module 103 connects the first intersection point 61 with a highest point of alae of the nose 84 of the face for obtaining a fourth auxiliary line 94 (step S206). In particular, the fourth auxiliary line 94 may include a left auxiliary line linked from the left-first intersection point to a left ala of the nose and a right auxiliary line linked from the right-first intersection point to a right ala of the nose.

Next, the determining module 103 horizontally moves the fourth auxiliary line 94 down to a position that may intersect with the first horizontal line 71, so as to obtain a fifth auxiliary line 95 (step S208). In particular, the fifth auxiliary line 95 may include a left auxiliary line generated from horizontally moving down the fourth auxiliary line 94 on the left side and a right auxiliary line generated from horizontally moving down the fourth auxiliary line 94 on the right side.

Further, the determining module 103 generates a vertical line upon a corner of the mouth 81 of the face which is deemed a sixth auxiliary line 96 (step S210). In particular, the sixth auxiliary line 96 may include a left auxiliary line generated vertically from a left corner of the mouth and a right auxiliary line generated vertically from a right corner of the mouth. Therefore, the determining module 103 may constitute blush positions A2 on the face based on the fourth auxiliary line 94, the fifth auxiliary line 95, and the sixth auxiliary line 96 (step S212).

More specific, the blush positions A2 may include a left-side blush position A2 constituted by the fourth to the sixth auxiliary lines 94-96 on the left side, and a right-side blush position A2 constituted by the fourth to the sixth auxiliary lines 94-96 on the right side. In particular, the blush positions A2 are the areas surrounded by the fourth auxiliary line 94, the fifth auxiliary line 95, the sixth auxiliary line 96, and the contour of the face.

Figure 10A:
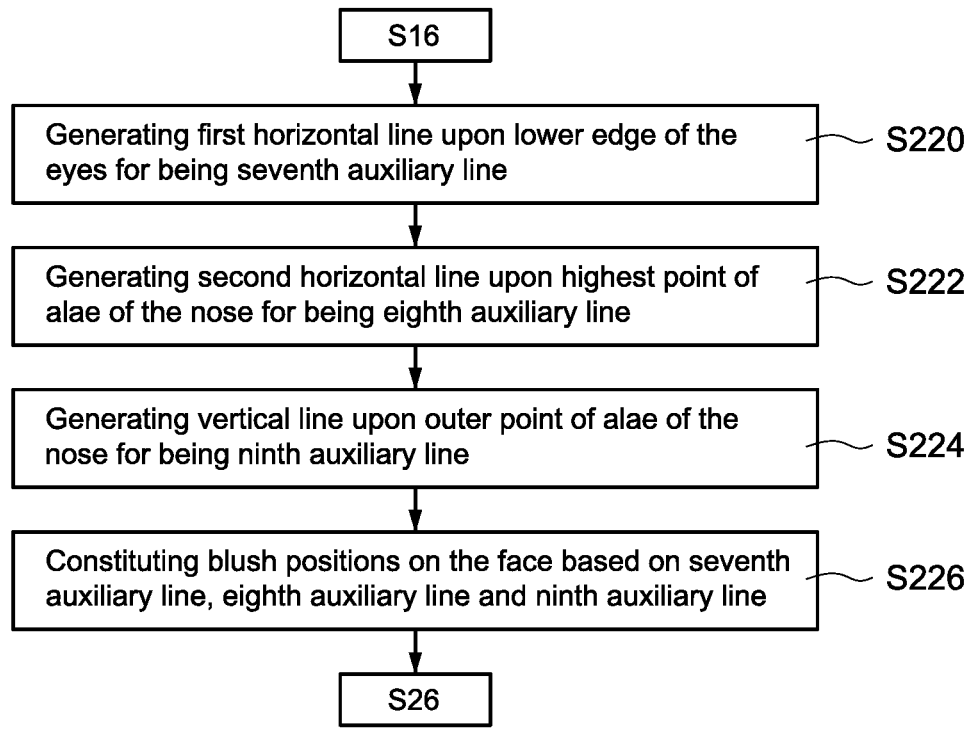
FIG. 10A is a flowchart for positioning the blushes according to a third embodiment of the present invention.
Figure 10B:
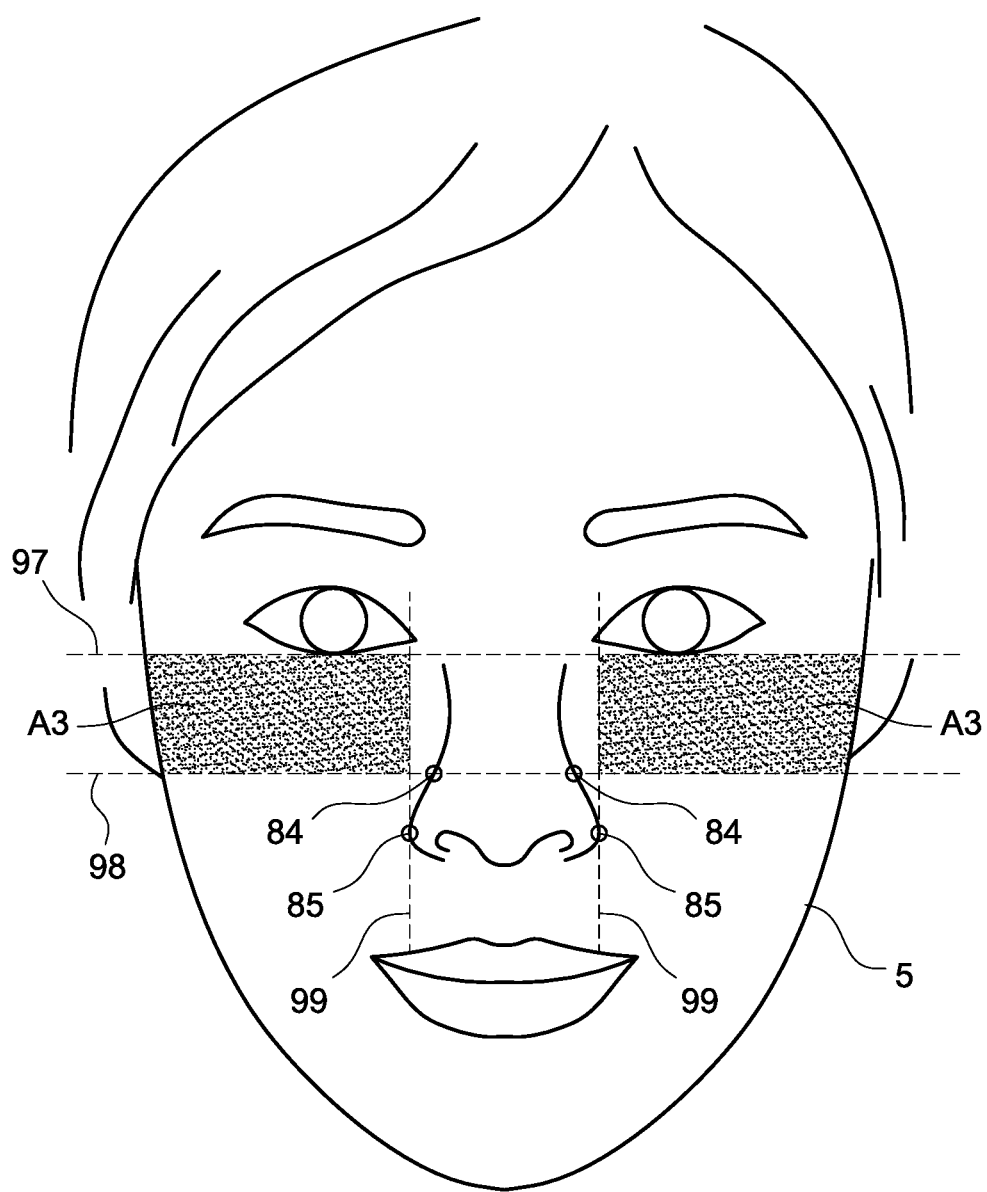
FIG. 10B is a schematic diagram showing blush positions according to the third embodiment of the present invention.

FIG. 10A is a flowchart for positioning the blushes according to a third embodiment of the present invention. FIG. 10B is a schematic diagram showing blush positions according to the third embodiment of the present invention. FIG. 10A is used to describe how the determining module 103 finds the blush positions through the third positioning process in the above step S22 once the face type of the user is recognized as a long face by the positioning module 102 in the above step S16. More specific, the third positioning process is composed of the computer executable program codes recorded by the processor 10, and the determining module 103 may perform each step shown in FIG. 10A while executing the third positioning process.

The following paragraphs are describing the third positioning process in company with FIG. 10B.

First, the determining module 103 generates a first horizontal line 71 upon a lower edge of the eyes which is deemed a seventh auxiliary line 97 (step S220). In particular, the seventh auxiliary line 97 may include a left auxiliary line extended from the left eye to the left and a right auxiliary line extended from the right eye to the right. Next, the determining module 103 generates a second horizontal line 72 upon a highest point of alae of the nose 84 which is deemed a eighth auxiliary line 98 (step S222). In particular, the eighth auxiliary line 98 may include a left auxiliary line extended from a left ala to the left and a right auxiliary line extended from a right ala to the right.

Next, the determining module 103 generates a vertical line upon an outer point of alae of the nose 85 of the face which is deemed a ninth auxiliary line 99 (step S224). In particular, the ninth auxiliary line 99 may include a left auxiliary line generated vertically from a left outer-ala of the nose and a right auxiliary line generated vertically from a right outer-ala of the nose. Therefore, the determining module 103 may constitute blush positions A3 on the face based on the seventh auxiliary line 97, the eighth auxiliary line 98 and the ninth auxiliary line 99 (step S226).

More specific, the blush positions A3 may include a left-side blush position A3 constituted by the seventh to the ninth auxiliary lines 97-99 on the left side, and a right-side blush position A3 constituted by the seventh to the ninth auxiliary lines 97-99 on the right side. In particular, the blush positions A3 are the areas surrounded by the seventh auxiliary line 97, the eighth auxiliary line 98, the ninth auxiliary line 99, and the contour of the face.

Figure 11A:
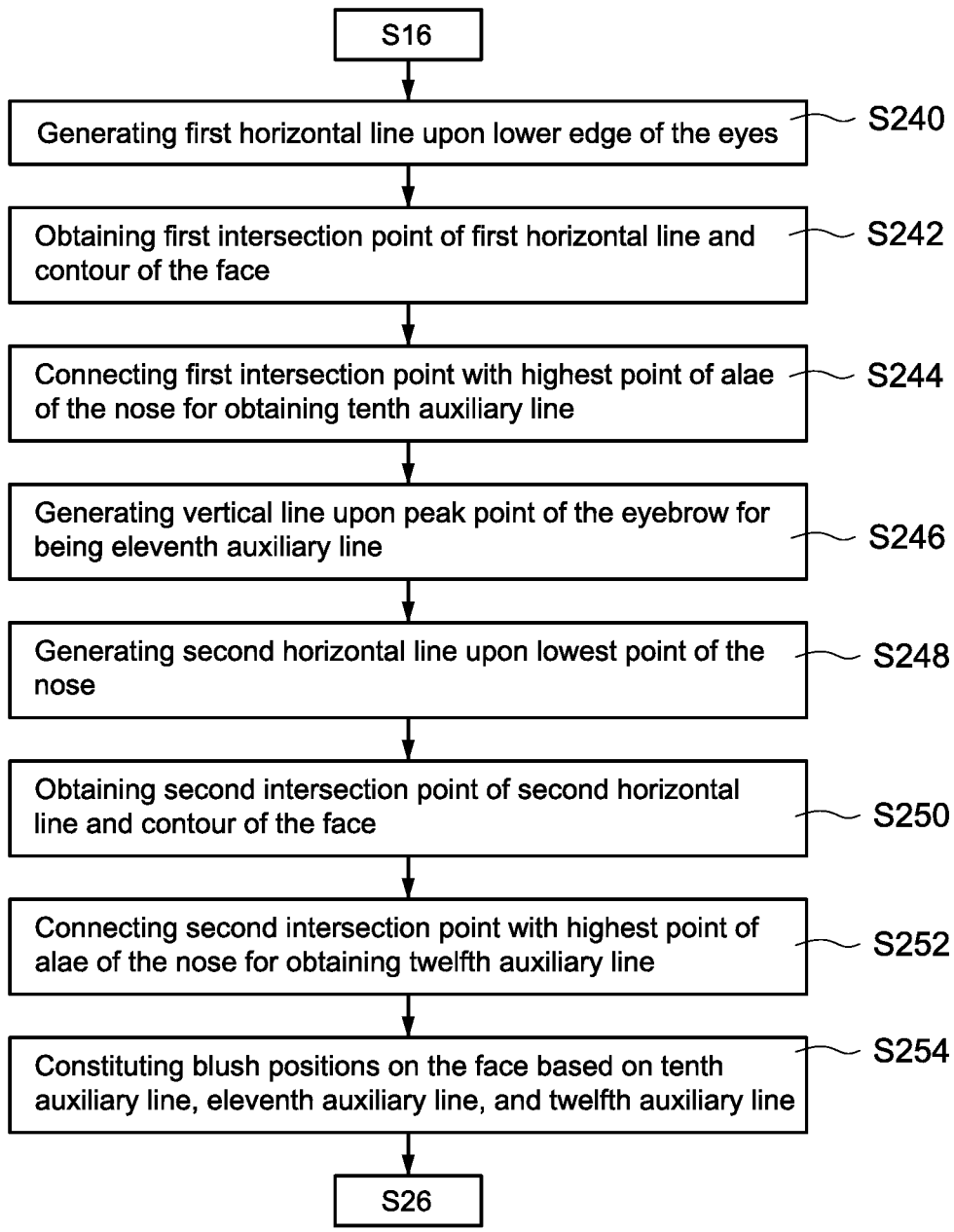
FIG. 11A is a flowchart for positioning the blushes according to a fourth embodiment of the present invention.
Figure 11B:
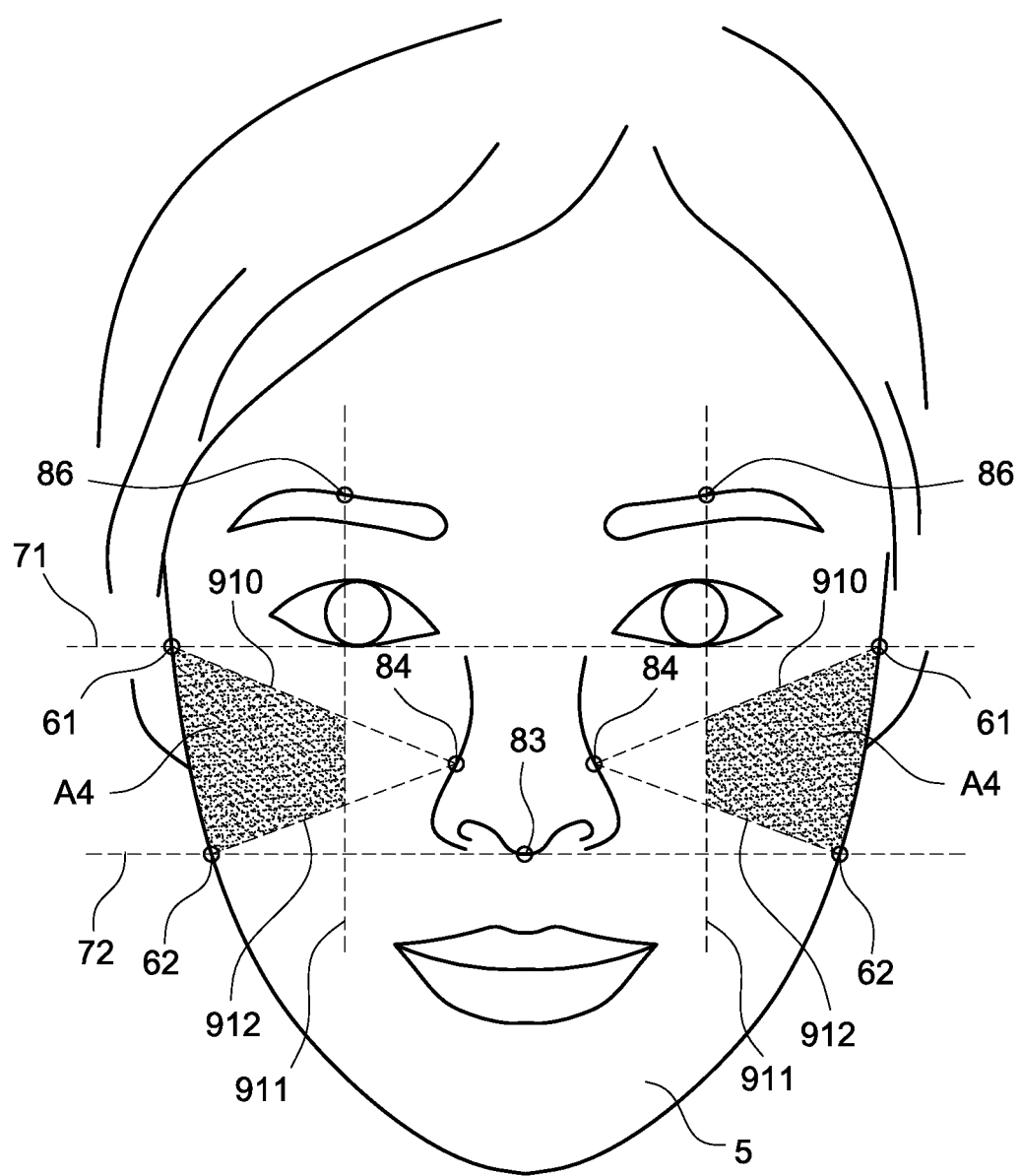
FIG. 11B is a schematic diagram showing blush positions according to the fourth embodiment of the present invention.

FIG. 11A is a flowchart for positioning the blushes according to a fourth embodiment of the present invention. FIG. 11B is a schematic diagram showing blush positions according to the fourth embodiment of the present invention. FIG. 11A is used to describe how the determining module 103 finds the blush positions through the fourth positioning process in the above step S24 once the face type of the user is recognized as an inverted triangular face or a diamond face by the positioning module 102 in the above step S16. More specific, the fourth positioning process is composed of the computer executable program codes recorded by the processor 10, and the determining module 103 may perform each step shown in FIG. 11A while executing the fourth positioning process.

The following paragraphs are describing the fourth positioning process in company with FIG. 11B.

First, the determining module 103 generates a first horizontal line 71 upon a lower edge of the eyes of the face (step S240), and obtains a first intersection point 61 of the first horizontal line 71 and a contour of the face (step S242). In particular, the first intersection point 61 may include a left-first intersection point of the first horizontal line 71 and a left contour of the face and a right-first intersection point of the first horizontal line 71 and a right contour of the face.

Next, the determining module 103 connects the first intersection point 61 with a highest point of alae of the nose 84 of the face for obtaining a tenth auxiliary line 910 (step S244). In particular, the tenth auxiliary line 910 may include a left auxiliary line linked from the left-first intersection point to a left ala of the nose and a right auxiliary line linked from the right-first intersection point to a right ala of the nose.

Next, the determining module 103 generates a vertical line upon a peak point of the eyebrow 86 of the face which is deemed an eleventh auxiliary line 911 (step S246). In particular, the eleventh auxiliary line 911 may include a left auxiliary line generated vertically from a peak point of a left eyebrow and a right auxiliary line generated vertically from a peak point of a right eyebrow.

Next, the determining module 103 generates a second horizontal line 72 upon a lowest point of the nose 83 of the face (step S248), and obtains a second intersection point 62 of the second horizontal line 72 and the contour of the face (step S250). In particular, the second intersection point 62 may include a left-second intersection point of the second horizontal line 72 and the left contour of the face and a right-second intersection point of the second horizontal line 72 and the right contour of the face.

Next, the determining module 103 connects the second intersection point 62 with the highest point of alae of the nose 84 for obtaining a twelfth auxiliary line 912 (step S252). In particular, the twelfth auxiliary line 912 may include a left auxiliary line linked from the left-second intersection point to the left ala of the nose and a right auxiliary line linked from the right-second intersection point to the right ala of the nose. Therefore, the determining module 103 may constitute blush positions A4 on the face based on the tenth auxiliary line 910, the eleventh auxiliary line 911, and the twelfth auxiliary line 912 (step S254).

More specific, the blush positions A4 may include a left-side blush position A4 constituted by the tenth to the twelfth auxiliary lines 910-912 on the left side, and a right-side blush position A4 constituted by the tenth to the twelfth auxiliary lines 910-912 on the right side. In particular, the blush positions A4 are the areas surrounded by the tenth auxiliary line 910, the eleventh auxiliary line 911, the twelfth auxiliary line 912, and the contour of the face.

Once the processor 10 finds any one of the above blush positions A1-A4, the analysis apparatus 1 may proceed executing the aforementioned step S26 for displaying the face image and the indicator of the blush positions A1-A4 on the mirror screen 11, and further analyzes and compares the conditions of the blushes.

As mentioned, the processor 10 of the analysis apparatus 1 in the present invention may compare the left-side blush with the right-side blush of the user, or compare the blushes of the user (including the left-side blush and the right-side blush) with the default data or the selected compared image(s) (such as AR image(s)).

Figure 12:
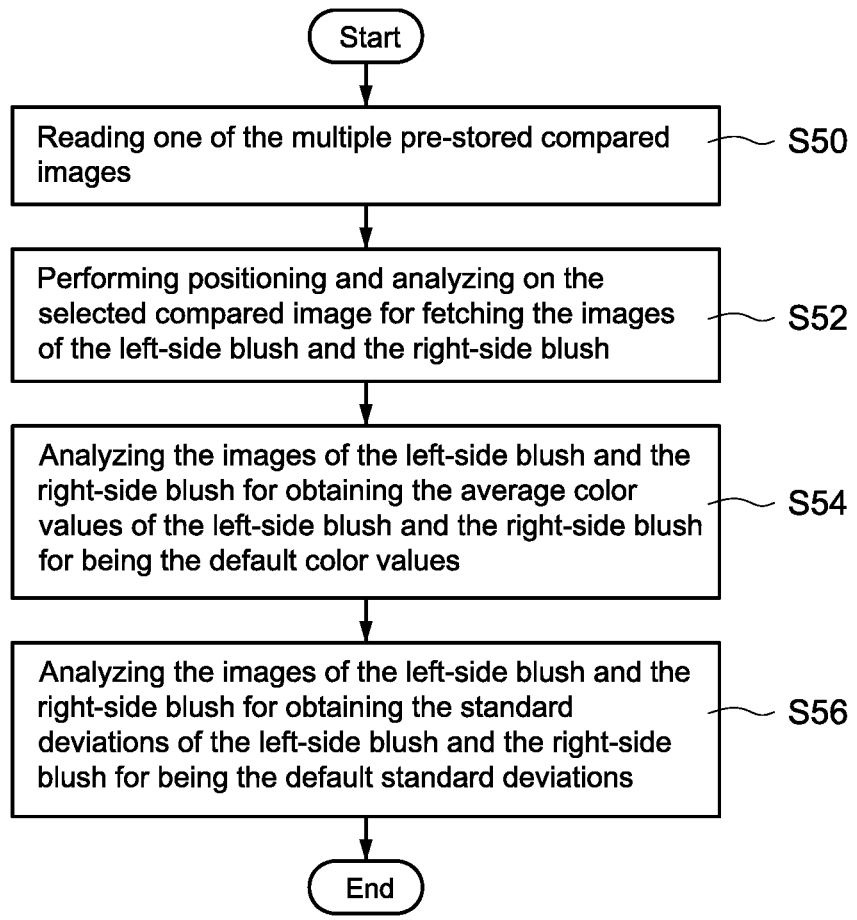
FIG. 12 is a flowchart for analyzing default values according to a first embodiment of the present invention.

FIG. 12 is a flowchart for analyzing default values according to a first embodiment of the present invention. FIG. 12 is used to interpret the aforementioned default color values and the default standard deviations.

In the embodiment, the analysis apparatus 1 may read one of the multiple pre-stored compared images through the processor 10 (step S50). Next, the processor 10 performs positioning and analyzing on the selected compared image through the positioning module 102, and fetches the images of the left-side blush and the right-side blush from the compared image through the determining module 103 (step S52).

Next, the processor 10 performs analyzing on the images of the left-side blush and the right-side blush through the analyzing module 104 for obtaining average color values of the left-side blush and the right-side blush for being the aforementioned default color values (step S54). On the other hand, the processor 10 also performs analyzing on the images of the left-side blush and the right-side blush through the analyzing module 104 for obtaining standard deviations of the left-side blush and the right-side blush for being the aforementioned default standard deviations (step S56). In the embodiment, the analyzing module 104 may apply one or multiple image analyzing algorithms of the related art for analyzing the default color values and the default standard deviations of the left-side blush and the right-side blush according to the fetched images.

In one embodiment, the user may operate the analysis apparatus 1 before applying cosmetics, and then selects one of the multiple compared images displayed by the display module 111 of the analysis apparatus 1 through the input interface 15. Therefore, the user may first check the selected compared image through the mirror screen 11 for confirming the appearance after applying cosmetics, and decides whether to apply the current displayed compared image or not. As such, the analysis apparatus 1 may compare the conditions of the current blushes of the user with the compared image selected by the user in such auxiliary mode for assisting the user to quickly complete the make-up identical to the compared image.

Figure 13:
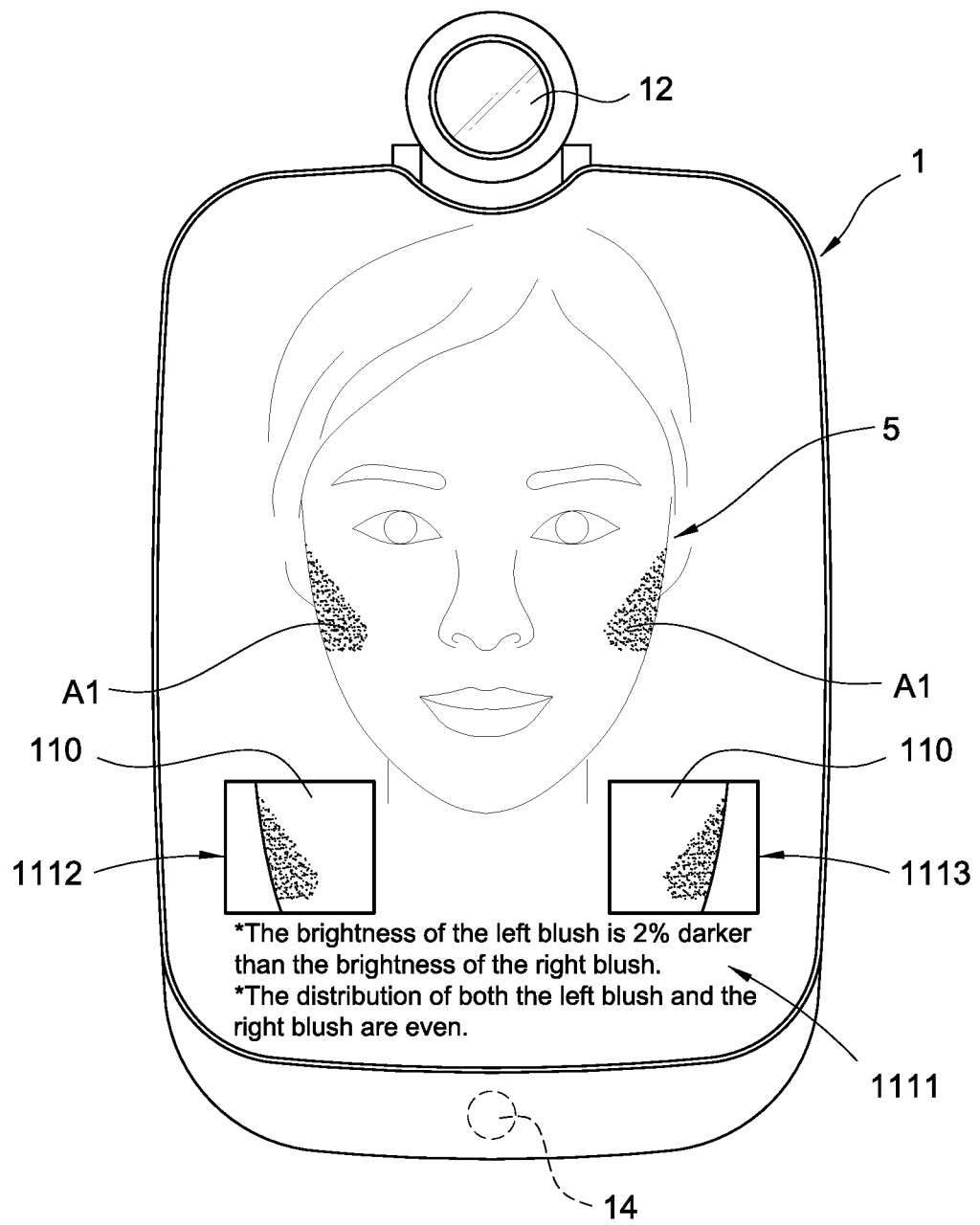
FIG. 13 is a schematic diagram of the analysis apparatus according to a third embodiment of the present invention.

FIG. 13 is a schematic diagram of the analysis apparatus according to a third embodiment of the present invention. As mentioned above, the analysis apparatus 1 of the present invention captures face image of the user 5 in real-time for comparing the left-side blush with the right-side blush of the user, and displays the comparison result on an information displaying area 1111 of the mirror screen 11. If the analysis apparatus 1 compares the current conditions of the blushes of the user 5 with a specific compared image 110, it may also display the selected compared image 110 on image displaying areas 1112, 1113 of the mirror screen 11, so as to inform the user 5 about the appearance after applying cosmetics.

More specific, the analysis apparatus 1 may read the compared image 110 selected by the user 5 from the multiple compared images for processing in advance (such as an enlargement processing), then the analysis apparatus 1 displays the entire compared image 110 on the image displaying areas 1112, 1113, or partially displays a close-up image corresponding to the left blush and the right blush of the compared image 110.

As shown in FIG. 13, the mirror screen 11 includes the information displaying area 1111. The analysis apparatus 1 may control the display module 111 to display the aforementioned comparison result (and the second comparison result) on the information displaying area 1111 of the mirror screen 11.

In this embodiment, the user 5 may see a reflect image of his/her own face right on the mirror screen 11, and realizes if the condition (e.g., the color and the distribution) of the left blush is equal to or similar to that of the right blush through the information displaying area 1111.

For an instance, the comparison result in FIG. 13 shows that the brightness of the left blush is 2% darker than the brightness of the right blush, and the distribution of both the left blush and the right blush are even. Therefore, the analysis apparatus 1 may effectively assist the user 5 in applying cosmetics for the blushes, so as to increase the make-up speed of the user 5 and also optimize the make-up quality.

By way of the analysis apparatus 1 and the analysis method of the present invention, the user 5 may see his/her face look on the mirror screen 11 and also receive an image analysis upon his/her blush positions while applying cosmetics, so as to apply cosmetics more quickly and accurately.

As the skilled person will appreciate, various changes and modifications can be made to the described embodiment. It is intended to include all such variations, modifications and equivalents which fall within the scope of the present invention, as defined in the accompanying claims.

What is claimed is:

1. A blush analysis method, adopted by a body information analysis apparatus, comprising:
   a) capturing an external image through an image capturing module of the body information analysis apparatus;
   b) performing positioning actions to each facial feature of a face and determining a face type of the face once the face is recognized from the external image by a processor of the body information analysis apparatus;
   c) executing a corresponding positioning process by the processor according to the face type for finding positions of a left blush and a right blush on the face, comprising:
      c1) performing a first positioning process by the processor for finding the positions of the left blush and the right blush if the face is recognized as an oval face;
      c2) performing a second positioning process by the processor for finding the positions of the left blush and the right blush if the face is recognized as a round face or a square face;
      c3) performing a third positioning process by the processor for finding the positions of the left blush and the right blush if the face is recognized as a long face; and
      c4) performing a fourth positioning process by the processor for finding the positions of the left blush and the right blush if the face is recognized as an inverted triangular face or a diamond face;
   d) analyzing a first average color value of the left blush and a second average color value of the right blush by the processor;
   e) comparing the first average color value and the second average color value with default color values, or comparing the first average color value with the second average color value, and generating a comparison result; and
   f) displaying the comparison result through a display module of the body information analysis apparatus.

2. The blush analysis method of claim 1, further comprising following steps:
   g1) determining whether the comparison result complies with a completion standard; and
   g2) re-executing the step c) to the step f) before the comparison result complies with the completion standard.

3. The blush analysis method of claim 1, wherein the first positioning process of the step c1) comprises following steps:
- c11) generating a first horizontal line upon a lower edge of eyes of the face;
- c12) obtaining a first intersection point of the first horizontal line and a contour of the face;
- c13) obtaining a first auxiliary line through connecting the first intersection point to a corner of a mouth of the face;
- c14) generating a second horizontal line upon the corner of the mouth;
- c15) obtaining a second intersection point of the second horizontal line and the contour of the face;
- c16) obtaining a second auxiliary line through connecting the second intersection point to a midpoint of a lower eyelid of the face;
- c17) generating a third horizontal line for being a third auxiliary line upon a lowest point of a nose of the face; and
- c18) constituting the positions of the left blush and the right blush based on the first auxiliary line, the second auxiliary line, and the third auxiliary line (93).

4. The blush analysis method of claim 1, wherein the second positioning process of the step c2) comprises following steps:
- c21) generating a first horizontal line upon a lowest point of a nose of the face;
- c22) generating a second horizontal line upon a lower edge of eyes of the face;
- c23) obtaining a first intersection point of the second horizontal line and a contour of the face;
- c24) obtaining a fourth auxiliary line through connecting the first intersection point (61) to a highest point of alae of the nose of the face;
- c25) obtaining a fifth auxiliary line through horizontally moving the fourth auxiliary line down to a position that intersects with the first horizontal line;
- c26) generating a vertical line upon a corner of a mouth of the face for being a sixth auxiliary line; and
- c27) constituting the positions of the left blush and the right blush based on the fourth auxiliary line, the fifth auxiliary line, and the sixth auxiliary line.

5. The blush analysis method of claim 1, wherein the third positioning process of the step c3) comprises following steps:
- c31) generating a first horizontal line upon a lower edge of eyes of the face for being a seventh auxiliary line;
- c32) generating a second horizontal line upon a highest point of alae of a nose of the face for being an eighth auxiliary line;
- c33) generating a vertical line upon an outer point of alae of the nose of the face for being a ninth auxiliary line; and
- c34) constituting the positions of the left blush and the right blush based on the seventh auxiliary line, the eighth auxiliary line, and the ninth auxiliary line.

6. The blush analysis method of claim 1, wherein the fourth positioning process of the step c4) comprises following steps:
- c41) generating a first horizontal line upon a lower edge of eyes of the face;
- c42) generating a first intersection point of the first horizontal line and a contour of the face;
- c43) obtaining a tenth auxiliary line through connecting the first intersection point to a highest point of alae of a nose of the face;
- c44) generating a vertical line upon a peak point of eyebrows of the face for being an eleventh auxiliary line;
- c45) generating a second horizontal line upon a lowest point of the nose of the face;
- c46) obtaining a second intersection point of the second horizontal line and the contour of the face;
- c47) obtaining a twelfth auxiliary line through connecting the second intersection point to the highest point of alae of the nose; and
- c48) constituting the positions of the left blush and the right blush based on the tenth auxiliary line, the eleventh auxiliary line, and the twelfth auxiliary line.

7. The blush analysis method of claim 1, further comprising the following steps:
- i) analyzing a first standard deviation of the left blush and a second standard deviation of the right blush by the processor;
- j) comparing the first standard deviation and the second standard deviation with default standard deviations, or comparing the first standard deviation with the second standard deviation, and generating a second comparison result; and
- k) displaying the second comparison result through the display module.

8. A body information analysis apparatus, comprising:
- an image capturing module, for capturing an external image;
- a display module; and
- a processor electrically connected with the image capturing module and the display module, recognizing the external image for determining whether a face is present in the external image through a face recognizing module, and performing positioning actions to each facial feature of the face and determining a face type of the face through a positioning module once the face is recognized from the external image;
- wherein, the processor executes a corresponding positioning process according to the face type through a determining module for finding positions of a left blush and a right blush on the face, analyzes images of the left blush and the right blush through executing an algorithm by an analyzing module for generating a first average color value of the left blush and a second average color value of the right blush, and compares the first average color value and the second average color value with default color values or compares the first average color value with the second average color value through a comparing module, and generates a comparison result;
- wherein, the display module displays the comparison result.

9. The body information analysis apparatus of claim 8, wherein the determining module performs a first positioning process for executing following actions once the face is recognized as an oval face:
- generating a first horizontal line upon a lower edge of eyes of the face;
- obtaining a first intersection point of the first horizontal line and a contour of the face;
- obtaining a first auxiliary line through connecting the first intersection point to a corner of a mouth of the face;
- generating a second horizontal line upon the corner of the mouth;
- obtaining a second intersection point of the second horizontal line and the contour of the face;

obtaining a second auxiliary line through connecting the second intersection point to a midpoint of a lower eyelid of the face;

generating a third horizontal line for being a third auxiliary line upon a lowest point of a nose of the face; and constituting the positions of the left blush and the right blush based on the first auxiliary line, the second auxiliary line, and the third auxiliary line.

10. The body information analysis apparatus of claim 8, wherein the determining module performs a second positioning process for executing following actions once the face is recognized as a round face or a square face:

generating a first horizontal line upon a lowest point of a nose of the face;

generating a second horizontal line upon a lower edge of eyes of the face;

obtaining a first intersection point of the second horizontal line and a contour of the face;

obtaining a fourth auxiliary line through connecting the first intersection point to a highest point of alae of the nose of the face;

obtaining a fifth auxiliary line through horizontally moving the fourth auxiliary line down to a position that intersects with the first horizontal line;

generating a vertical line upon a corner of a mouth of the face for being a sixth auxiliary line; and constituting the positions of the left blush and the right blush based on the fourth auxiliary line, the fifth auxiliary line, and the sixth auxiliary line.

11. The body information analysis apparatus of claim 8, wherein the determining module performs a third positioning process for executing following actions once the face is recognized as a long face:

generating a first horizontal line upon a lower edge of eyes of the face for being a seventh auxiliary line;

generating a second horizontal line upon a highest point of alae of a nose (84) of the face for being an eighth auxiliary line;

generating a vertical line upon an outer point of alae of the nose of the face for being a ninth auxiliary line; and constituting the positions of the left blush and the right blush based on the seventh auxiliary line, the eighth auxiliary line, and the ninth auxiliary line.

12. The body information analysis apparatus of claim 8, wherein the determining module performs a fourth positioning process for executing following actions once the face is recognized as an inverted triangular face or a diamond face:

generating a first horizontal line upon a lower edge of eyes of the face;

generating a first intersection point of the first horizontal line and a contour of the face;

obtaining a tenth auxiliary line through connecting the first intersection point to a highest point of alae of a nose of the face;

generating a vertical line upon a peak point of eyebrows of the face for being an eleventh auxiliary line;

generating a second horizontal line upon a lowest point of the nose of the face;

obtaining a second intersection point of the second horizontal line and the contour of the face;

obtaining a twelfth auxiliary line through connecting the second intersection point to the highest point of alae of the nose; and constituting the positions of the left blush and the right blush based on the tenth auxiliary line, the eleventh auxiliary line, and the twelfth auxiliary line.

13. The body information analysis apparatus of claim 8, wherein the processor controls the analyzing module to analyze a first standard deviation of the left blush and a second standard deviation of the right blush, and controls the comparing module to compare the first standard deviation and the second standard deviation with default standard deviations, or compare the first standard deviation with the second standard deviation, and generate a second comparison result, and controls the display module to display the second comparison result.

14. A body information analysis apparatus, comprising:

an image capturing module, for capturing an external image;

a display module; and a processor electrically connected with the image capturing module and the display module, recognizing the external image, and performing positioning actions to each facial feature of a face and determining a face type of the face once the face is recognized from the external image;

wherein, the processor executes a corresponding positioning process according to the face type for finding positions of a left blush and a right blush on the face, and analyzes a first average color value of the left blush and a second average color value of the right blush, and compares the first average color value and the second average color value with default color values or compares the first average color value with the second average color value, and generates a comparison result;

wherein, the display module displays the comparison result;

wherein, the processor is configured to perform a first positioning process for finding the positions of the left blush and the right blush if the face is recognized as an oval face, to perform a second positioning process for finding the positions of the left blush and the right blush if the face is recognized as a round face or a square face, to perform a third positioning process for finding the positions of the left blush and the right blush if the face is recognized as a long face, and to perform a fourth positioning process for finding the positions of the left blush and the right blush if the face is recognized as an inverted triangular face or a diamond face.

15. The body information analysis apparatus in claim 14, wherein the processor comprises:

a face recognizing module, recognizing the external image for determining whether the face is present in the external image;

a positioning module, performing positioning actions to each facial feature of the face for determining the face type of the face;

a determining module, executing the first positioning process, the second positioning process, the third positioning process, or the fourth positioning process according to the face type for finding the positions of the left blush and the right blush on the face;

an analyzing module, analyzing images of the left blush and the right blush through an algorithm for generating the first average color value and the second average color value; and a comparing module, comparing the first average color value and the second average color value with the default color values, or comparing the first average color value with the second average color value, and generating the comparison result.

16. The body information analysis apparatus of claim 14, wherein the processor is configured to perform the first positioning process for executing following actions once the face is recognized as the oval face:
  generating a first horizontal line upon a lower edge of eyes of the face;
  obtaining a first intersection point of the first horizontal line and a contour of the face;
  obtaining a first auxiliary line through connecting the first intersection point to a corner of a mouth of the face;
  generating a second horizontal line upon the corner of the mouth;
  obtaining a second intersection point of the second horizontal line and the contour of the face;
  obtaining a second auxiliary line through connecting the second intersection point to a midpoint of a lower eyelid of the face;
  generating a third horizontal line for being a third auxiliary line upon a lowest point of a nose of the face; and
  constituting the positions of the left blush and the right blush based on the first auxiliary line, the second auxiliary line, and the third auxiliary line.

17. The body information analysis apparatus of claim 14, wherein the processor is configured to perform the second positioning process for executing following actions once the face is recognized as the round face or the square face:
  generating a first horizontal line upon a lowest point of a nose of the face;
  generating a second horizontal line upon a lower edge of eyes of the face;
  obtaining a first intersection point of the second horizontal line and a contour of the face;
  obtaining a fourth auxiliary line through connecting the first intersection point to a highest point of alae of the nose of the face;
  obtaining a fifth auxiliary line through horizontally moving the fourth auxiliary line down to a position that intersects with the first horizontal line;
  generating a vertical line upon a corner of a mouth of the face for being a sixth auxiliary line; and
  constituting the positions of the left blush and the right blush based on the fourth auxiliary line, the fifth auxiliary line, and the sixth auxiliary line.

18. The body information analysis apparatus of claim 14, wherein the processor is configured to perform the third positioning process for executing following actions once the face is recognized as the long face:
  generating a first horizontal line upon a lower edge of eyes of the face for being a seventh auxiliary line;
  generating a second horizontal line upon a highest point of alae of a nose of the face for being an eighth auxiliary line;
  generating a vertical line upon an outer point of alae of the nose of the face for being a ninth auxiliary line; and
  constituting the positions of the left blush and the right blush based on the seventh auxiliary line, the eighth auxiliary line, and the ninth auxiliary line.

19. The body information analysis apparatus of claim 14, wherein the processor is configured to perform the fourth positioning process for executing following actions once the face is recognized as the inverted triangular face or the diamond face:
  generating a first horizontal line upon a lower edge of eyes of the face;
  generating a first intersection point of the first horizontal line and a contour of the face;
  obtaining a tenth auxiliary line through connecting the first intersection point to a highest point of alae of a nose of the face;
  generating a vertical line upon a peak point of eyebrows of the face for being an eleventh auxiliary line;
  generating a second horizontal line upon a lowest point of the nose of the face;
  obtaining a second intersection point of the second horizontal line and the contour of the face;
  obtaining a twelfth auxiliary line through connecting the second intersection point to the highest point of alae of the nose; and
  constituting the positions of the left blush and the right blush based on the tenth auxiliary line, the eleventh auxiliary line, and the twelfth auxiliary line.

20. The body information analysis apparatus of claim 14, wherein the processor is configured to analyze a first standard deviation of the left blush and a second standard deviation of the right blush, and to compare the first standard deviation and the second standard deviation with default standard deviations, or compare the first standard deviation with the second standard deviation, and to generate a second comparison result, and to control the display module to display the second comparison result.

* * * * *